(12) United States Patent
Fujisaki

(10) Patent No.: US 9,128,273 B2
(45) Date of Patent: Sep. 8, 2015

(54) ZOOM LENS AND IMAGE PICKUP APPARATUS EQUIPPED WITH ZOOM LENS

(75) Inventor: Toyokatsu Fujisaki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/567,720

(22) Filed: Aug. 6, 2012

(65) Prior Publication Data

US 2013/0038765 A1 Feb. 14, 2013

(30) Foreign Application Priority Data

Aug. 9, 2011 (JP) ................................. 2011-173809

(51) Int. Cl.
*G02B 15/16* (2006.01)
*G02B 15/173* (2006.01)
*H04N 5/232* (2006.01)

(52) U.S. Cl.
CPC ............. *G02B 15/173* (2013.01); *G02B 15/16* (2013.01); *H04N 5/23296* (2013.01)

(58) Field of Classification Search
CPC ........ G02B 15/00; G02B 15/14; G02B 15/15; G02B 15/16; G02B 15/20
USPC .................................. 359/676–678, 683–687
See application file for complete search history.

(56) References Cited

U.S. PATENT DOCUMENTS

| 6,594,087 B2 | 7/2003 | Uzawa | |
|---|---|---|---|
| 7,430,079 B2 | 9/2008 | Watanabe | |
| 7,443,606 B2 | 10/2008 | Saruwatari | |
| 7,830,613 B2 | 11/2010 | Ichikawa | |
| 2007/0091460 A1* | 4/2007 | Saruwatari et al. | 359/687 |
| 2012/0307377 A1* | 12/2012 | Horiuchi | 359/687 |

FOREIGN PATENT DOCUMENTS

| CN | 101539659 A | 9/2009 |
|---|---|---|
| JP | 2007-047538 A | 2/2007 |
| JP | 2009-139701 A | 6/2009 |

* cited by examiner

*Primary Examiner* — Darryl J Collins
(74) *Attorney, Agent, or Firm* — Canon USA Inc IP Division

(57) ABSTRACT

A zoom lens includes a first lens unit of a positive refractive power, a second lens unit of a negative refractive power, a third lens unit of a positive refractive power, and a rear lens group including one or more lens units in order from an object side to an image side, the first, second, and third lens units being moved towards an object side during zooming from a wide-angle end to a telephoto end with respect to an image plane, wherein the first lens unit includes a positive lens and a negative lens, and movement amounts of the first, second, and third lens units during zooming from a wide-angle end to a telephoto end and a focal length of the entire zoom lens at the wide-angle end are appropriately set.

14 Claims, 25 Drawing Sheets

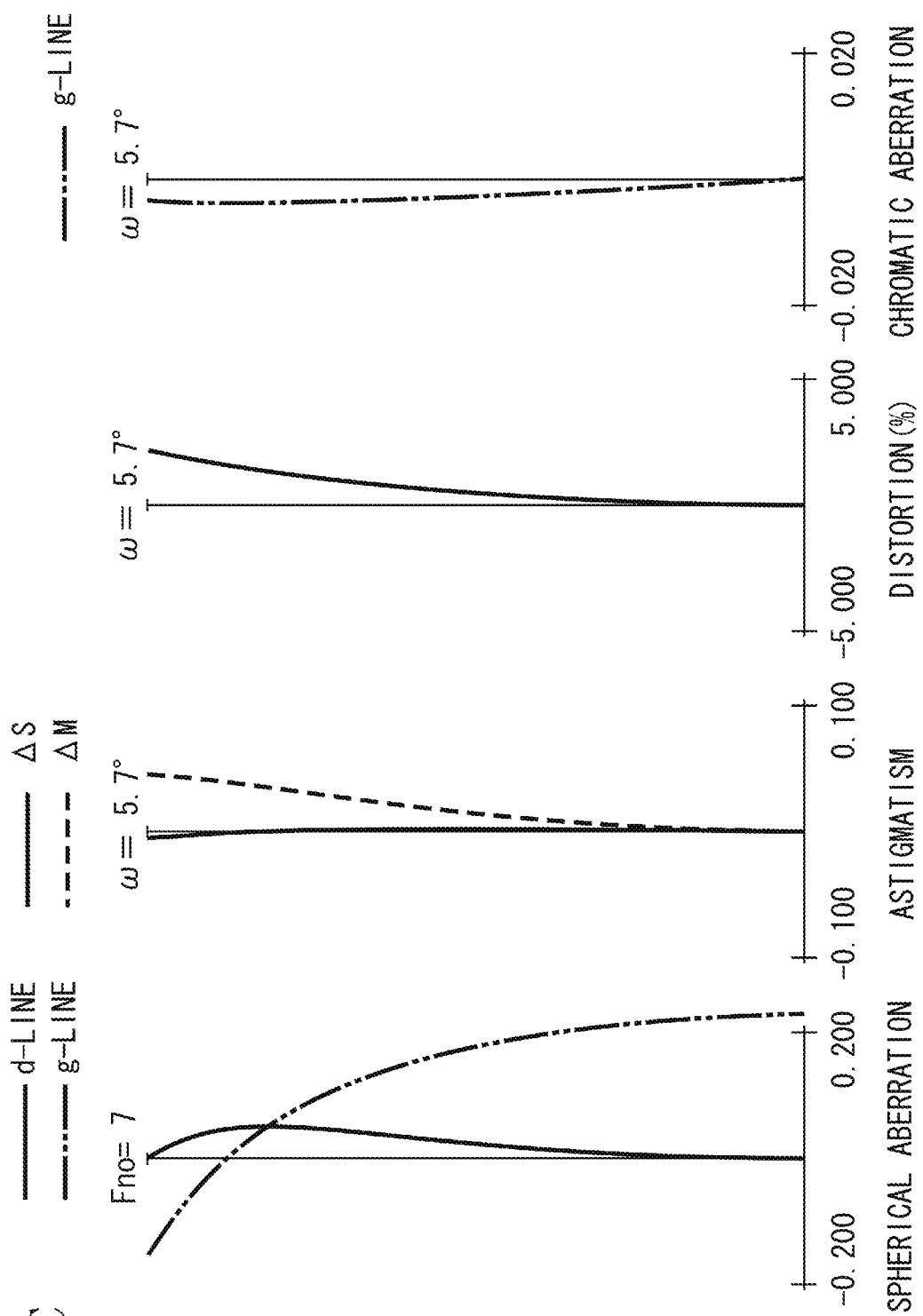

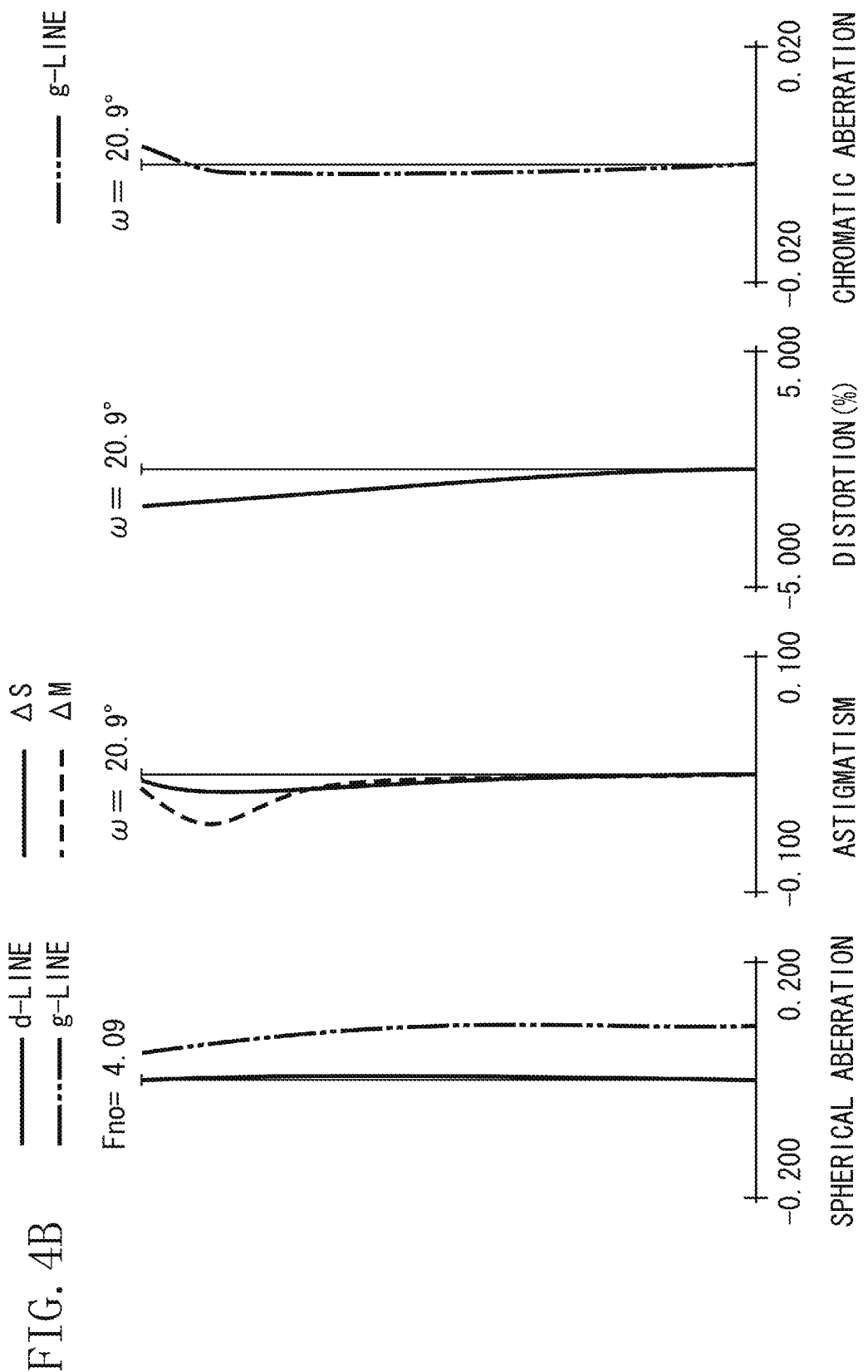

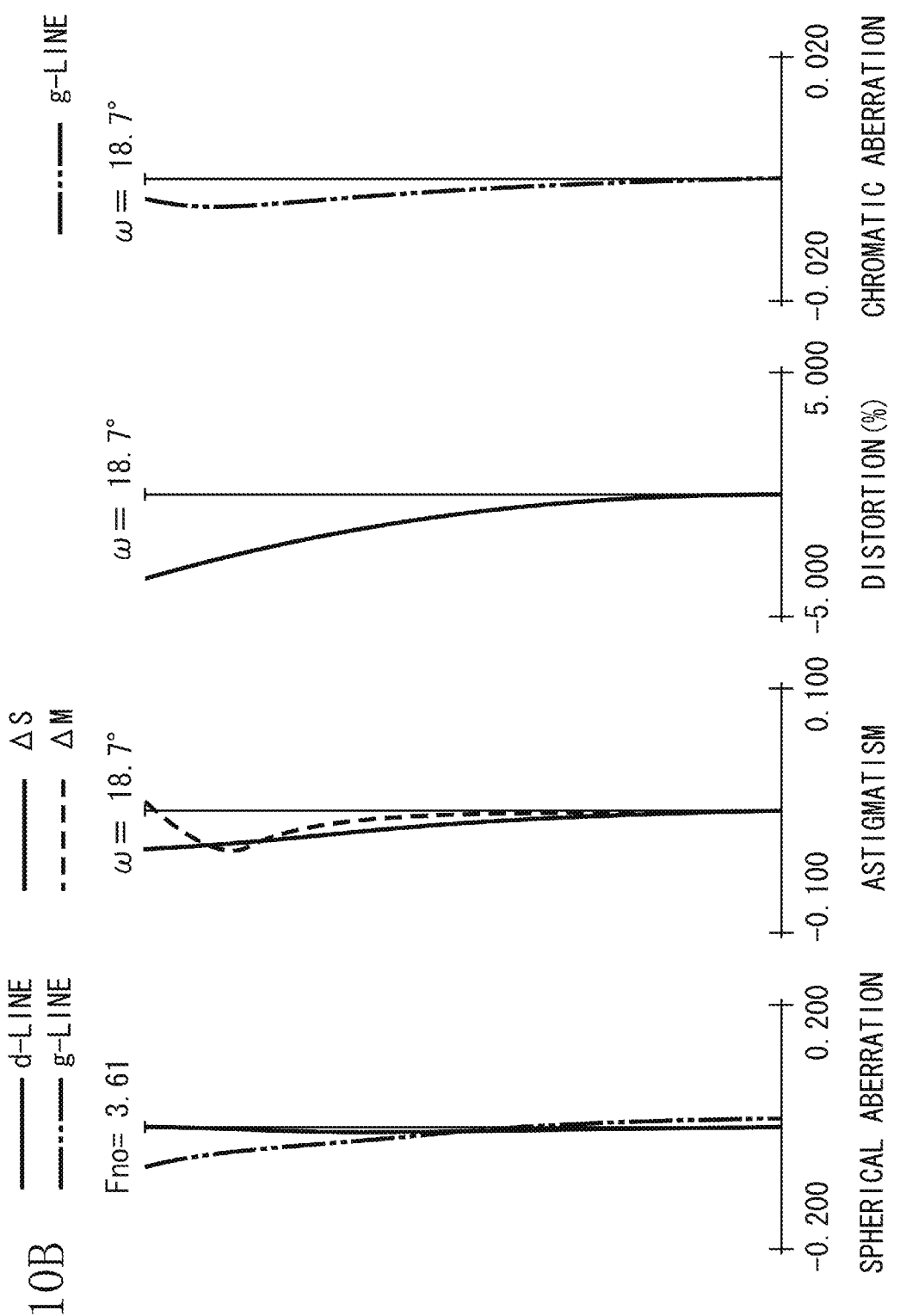

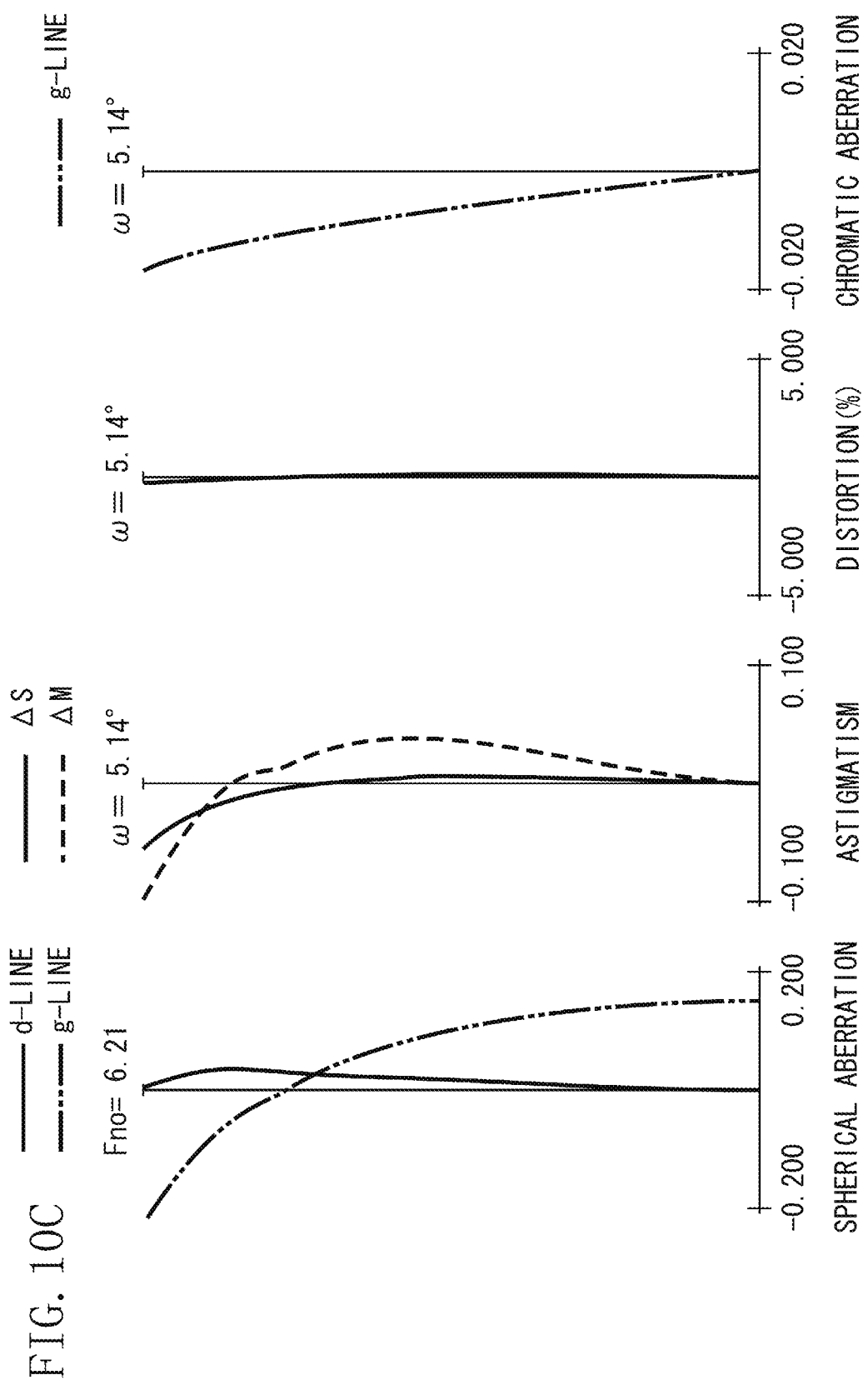

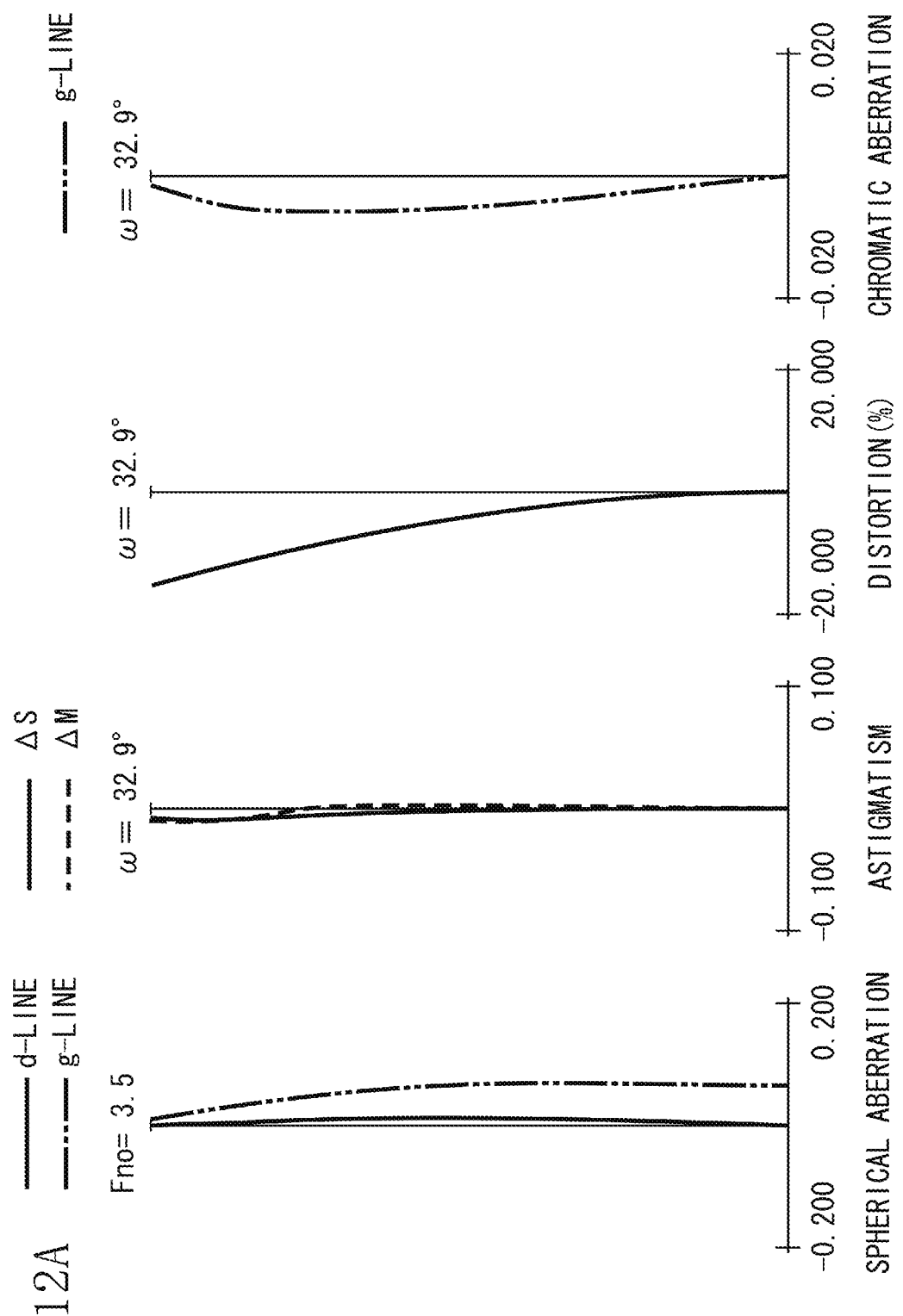

ZOOM LENS AND IMAGE PICKUP APPARATUS EQUIPPED WITH ZOOM LENS

BACKGROUND OF THE INVENTION

1. Field of the Invention

The present invention relates to a zoom lens, and more particularly, to a zoom lens suitable for a photographic lens used in an image pickup apparatus such as a digital camera, a video camera, a monitoring camera, a broadcasting camera, and a silver-halide film camera.

2. Description of the Related Art

As an image pickup apparatus is miniaturized with a high functionality, a photographic lens used in the image pickup apparatus is required to be a zoom lens which has a short lens length in entirety, a small size, a wide angle of view, and a high zoom ratio.

As a positive lead type zoom lens, there is known a four-unit zoom lens including a first lens unit of a positive refractive power, a second lens unit of a negative refractive power, a third lens unit of a positive refractive power, and a fourth lens unit of a positive refractive power in order from an object side to an image side, in which all of the lens units are moved during zooming. As the four-unit zoom lens, there is known a miniaturized zoom lens in which the first lens unit includes negative and positive lenses, and a zoom ratio of 4 to 10 can be obtained. In addition, as the positive lead type zoom lens, there is known a five-unit zoom lens including a first lens unit of a positive refractive power, a second lens unit of a negative refractive power, a third lens unit of a positive refractive power, a fourth lens unit of a negative refractive power, and a fifth lens unit of a positive refractive power in order from an object side to an image side.

In the related art, in order to reduce a thickness of the camera, a retractable system is used, in which a distance between lens units when it is not used is reduced in comparison with a distance between lens units when it is used. In the retractable system, in order to effectively reduce a thickness of the camera, it is useful to increase the refractive power of each lens unit and reduce the number of lenses of each lens unit and the thicknesses of the lens units.

However, if the refractive power of each lens surface increases, the lens thickness increases to obtain a lens edge thickness. In particular, a front lens diameter increases, so that it is difficult to achieve miniaturization. In addition, various types of aberration such as chromatic aberration are frequently generated at a telephoto end, and it is difficult to correct such aberration.

In the four-unit or five-unit zoom lens described above, in order to miniaturize the entire zoom lens and implement excellent optical performance with a high zoom ratio, it is important to appropriately set configurations of each lens unit, movement conditions for zooming, and the like. In particular, it is important to appropriately set the movement amounts of the first, second, and third lens units for zooming.

U.S. Pat. No. 7,830,613 discusses a lens configuration capable of advantageously obtaining a thin thickness at the time of retraction of the zoom lens by reducing the number of lenses. However, since the movement amount of the first lens unit for zooming is large in comparison with the movement amount of the third lens unit, the entire lens length at the telephoto end tends to increase. In addition, since the movement amount of the first lens unit is large, the number of retraction stages increases, and a lens barrel configuration becomes complicated. In addition, the size of the zoom lens increases in a radial direction thereof.

U.S. Pat. No. 7,430,079 discusses a zoom lens having a zoom ratio of about 10 times, in which the entire lens length is reduced at a telephoto end by restricting a movement amount of the first lens unit during zooming. However, it is difficult to reduce a thickness of the camera at the time of retraction due to a ratio between the movement amount of the second lens unit for zooming and a focal length at a wide-angle end. In addition, as the refractive power of the first lens unit increases, axial chromatic aberration, chromatic aberration of magnification, and the like are frequently generated at a telephoto end, and it is difficult to correct such aberration.

SUMMARY OF THE INVENTION

The present invention is directed to a zoom lens which has a short length in an optical axis direction at the time of retraction and is capable of obtaining excellent optical performance across the entire zoom lens with a wide angle of view and a high zoom ratio, and an image pickup apparatus equipped with the zoom lens.

According to an aspect of the present invention, a zoom lens includes, in order from an object side to an image side, a first lens unit of a positive refractive power, a second lens unit of a negative refractive power, a third lens unit of a positive refractive power, and a rear lens group including one or more lens units, the first, second, and third lens units being moved towards the object side during zooming from a wide-angle end to a telephoto end, wherein the first lens unit includes a positive lens and a negative lens, and the following conditions are satisfied:

$$0.5 < M2/fw < 5.0, \text{ and}$$

$$0.1 < M1/M3 < 1.0,$$

where M1, M2, and M3 denote movement amounts of the first, second, and third lens units, respectively, during zooming from the wide-angle end to the telephoto end, and fw denotes a focal length of the entire zoom lens at the wide-angle end.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 2A, 2B, and 2C are aberration diagrams of the zoom lens according to the first exemplary embodiment of the invention at the wide-angle end, the middle zoom position, and the telephoto end, respectively, in Numerical Example 1.

FIGS. 4A, 4B, and 4C are aberration diagrams of the zoom lens according to the second exemplary embodiment of the invention at the wide-angle end, the middle zoom position, and the telephoto end, respectively, in Numerical Example 2.

FIGS. 10A, 10B, and 10C are aberration diagrams of the zoom lens according to the fifth exemplary embodiment of the invention at the wide-angle end, the middle zoom position, and the telephoto end, respectively, in Numerical Example 5.

FIGS. 12A, 12B, and 12C are aberration diagrams of the zoom lens according to the sixth exemplary embodiment of the invention at the wide-angle end, the middle zoom position, and the telephoto end, respectively, in Numerical Example 6.

DESCRIPTION OF THE EMBODIMENTS

Various exemplary embodiments, features, and aspects of the invention will be described in detail below with reference to the drawings.

A zoom lens according to an exemplary embodiment of the invention includes a first lens unit of a positive refractive power, a second lens unit of a negative refractive power, a third lens unit of a positive refractive power, and a rear lens group including one or more lens units in order from an object side to an image side. Zooming from the wide-angle end to the telephoto end is performed by moving the first, second, and third lens units towards the object side with respect to an image plane.

Figure 1:
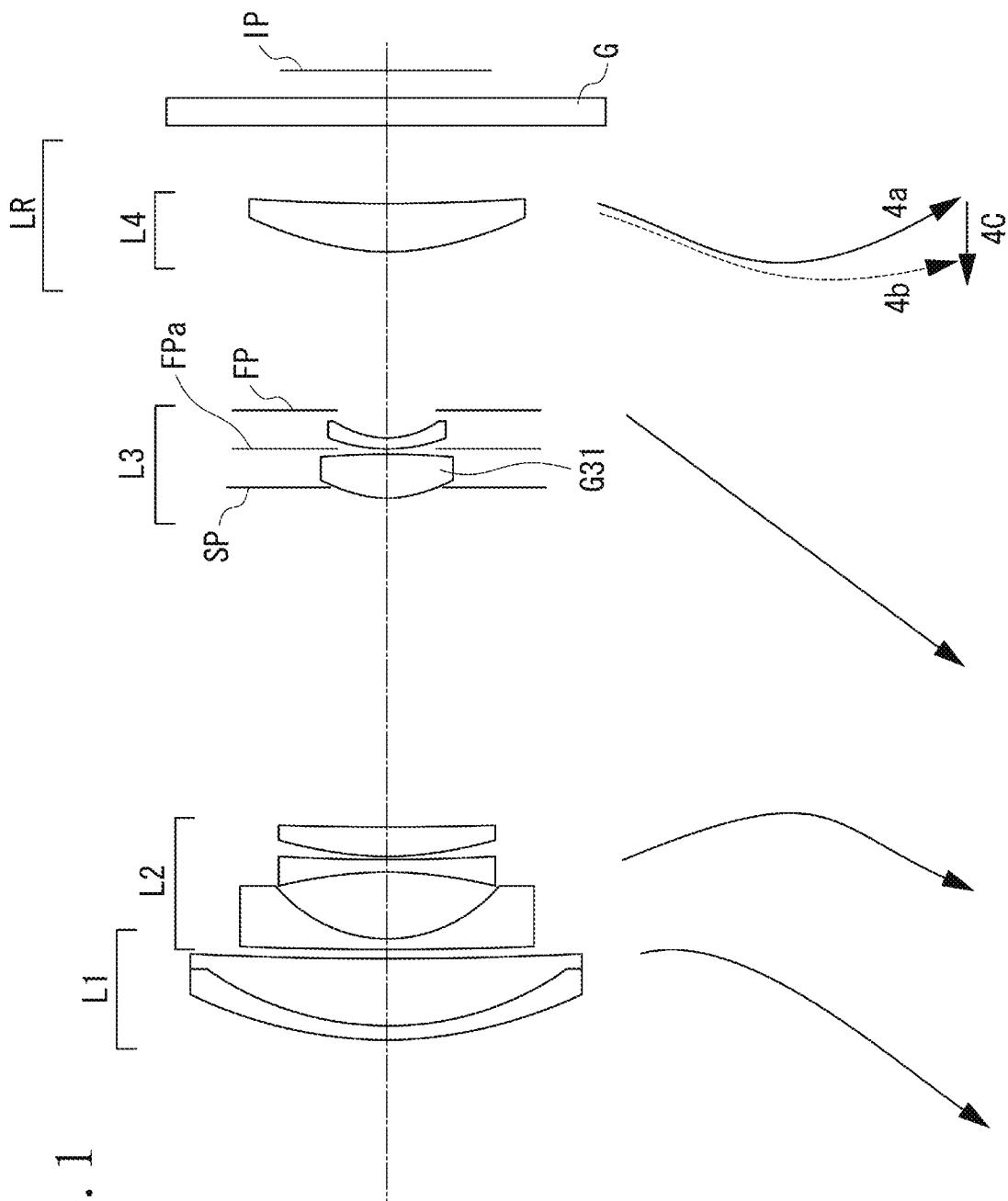
FIG. 1 is a lens cross-sectional view illustrating a zoom lens according to a first exemplary embodiment of the invention at the wide-angle end.
Figure 2A:
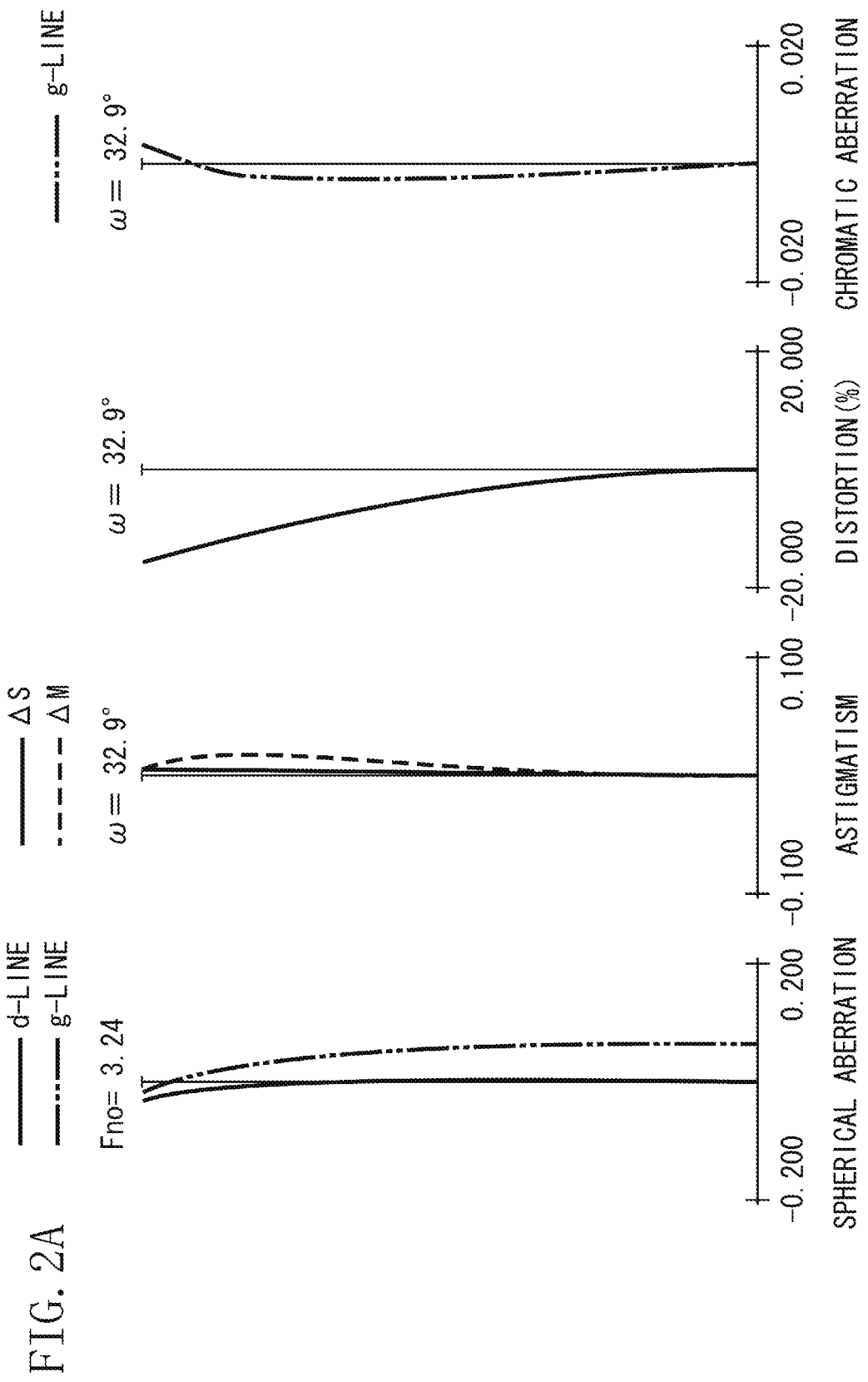
Figure 2B:
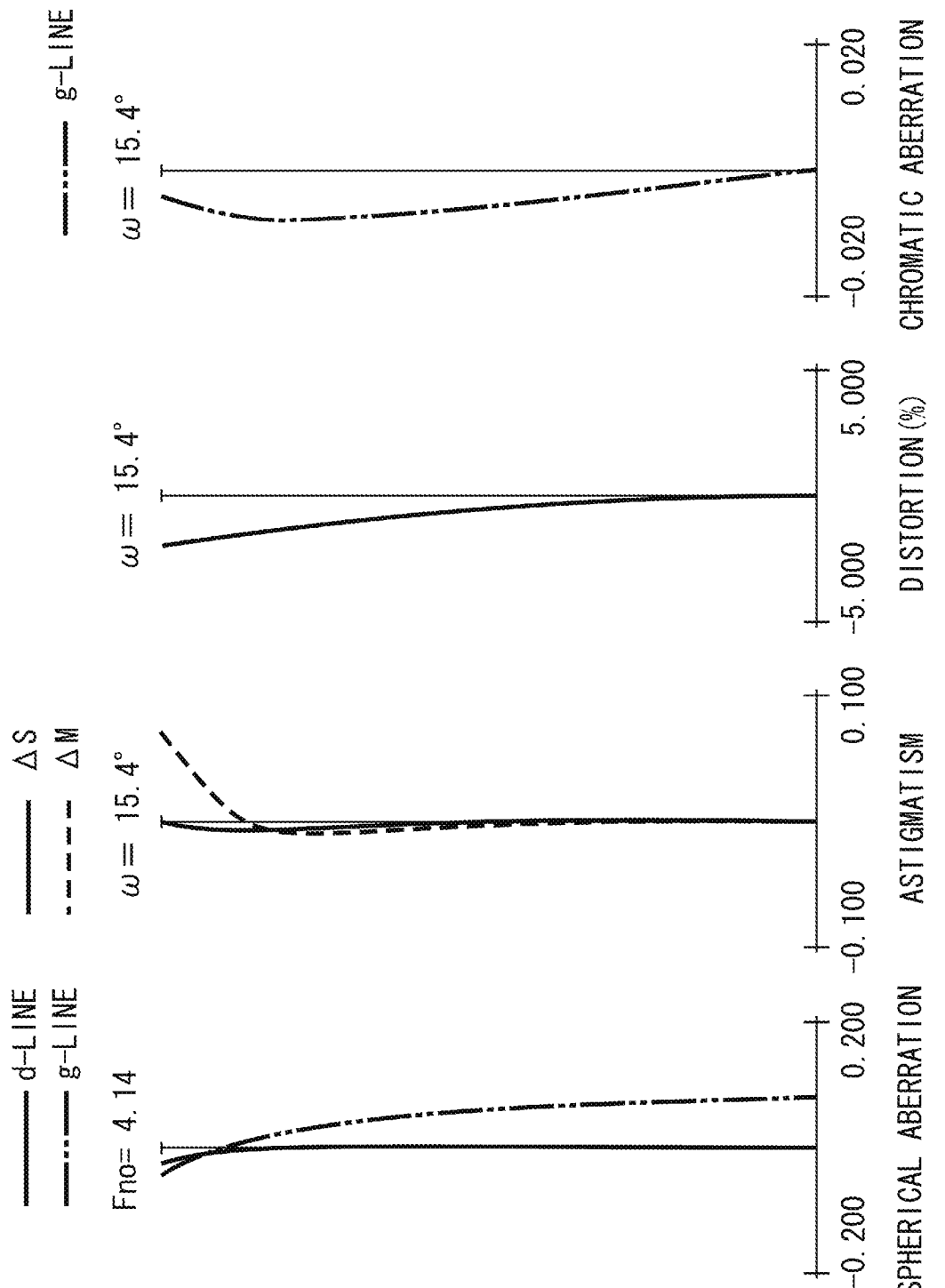
Figure 3:
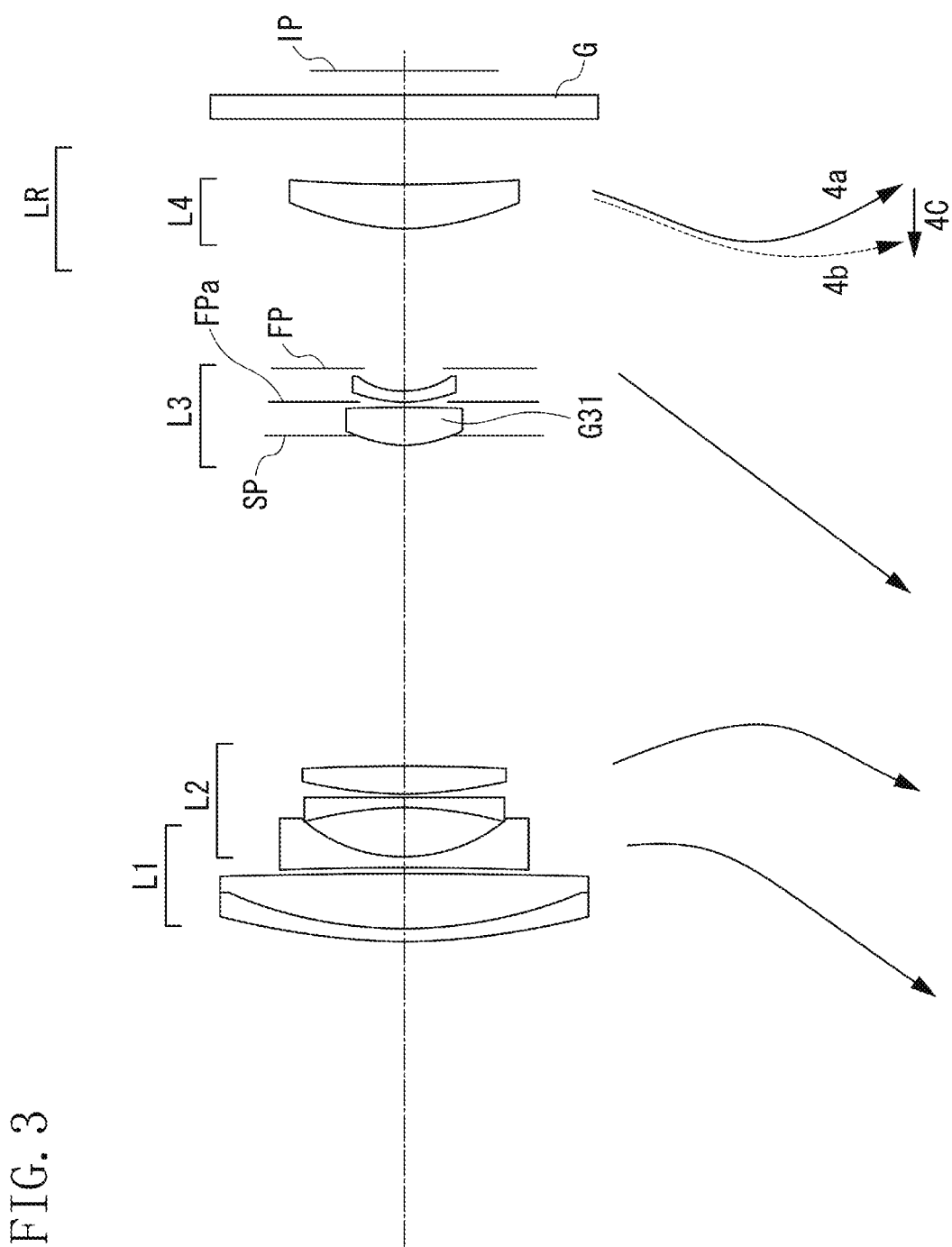
FIG. 3 is a lens cross-sectional view illustrating a zoom lens according to a second exemplary embodiment of the invention at the wide-angle end.
Figure 4A:
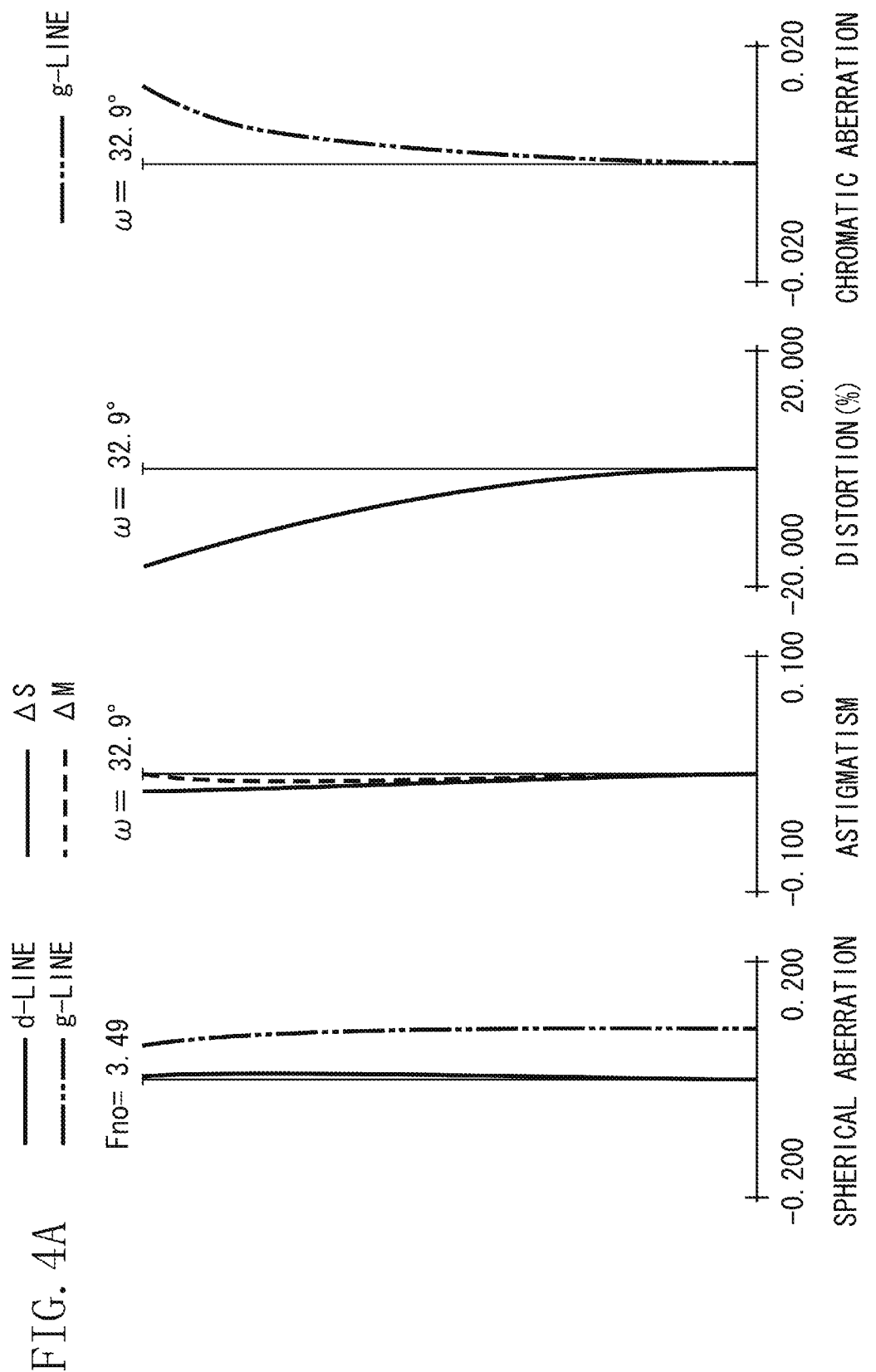
Figure 4C:
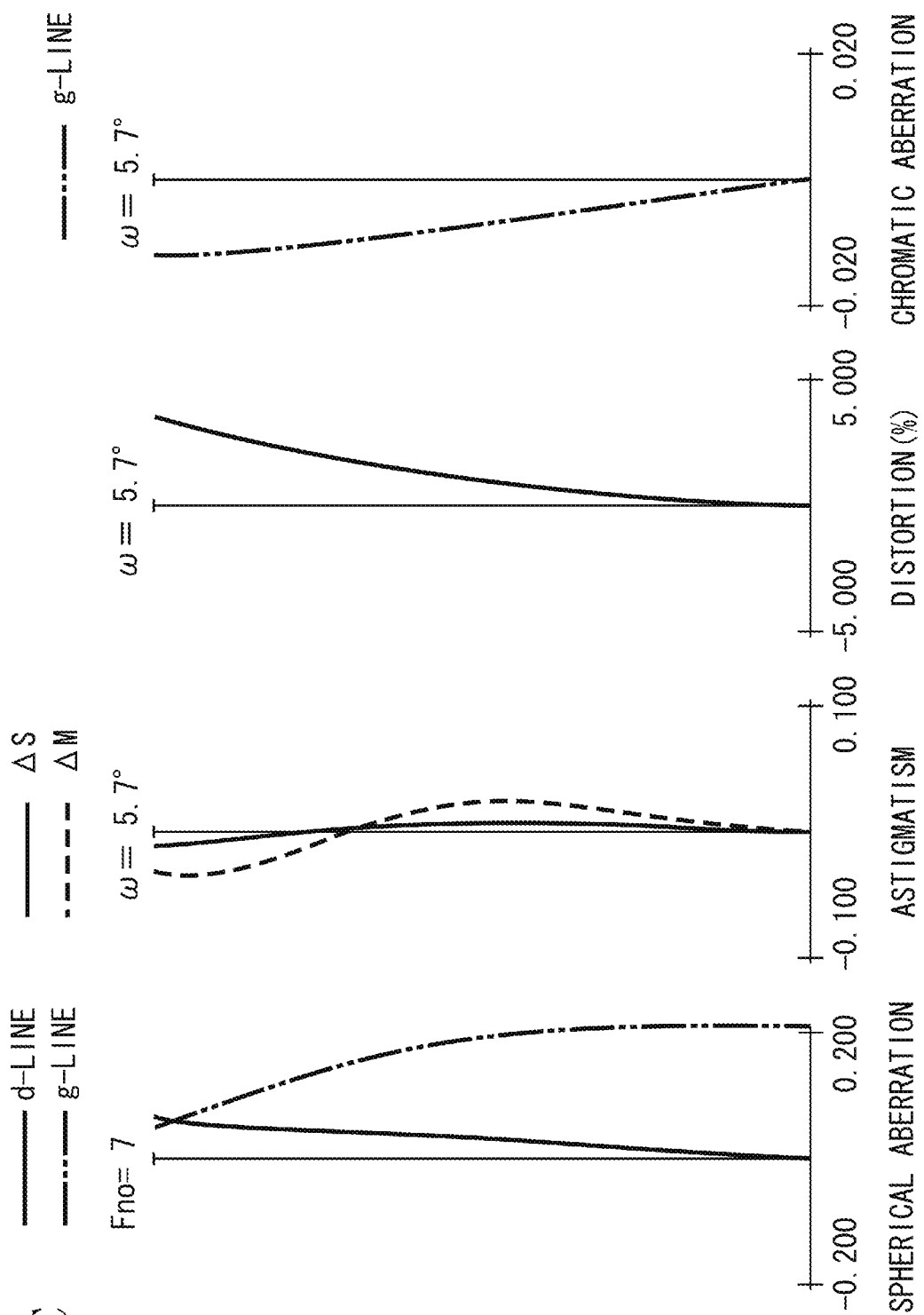

FIG. 1 is a lens cross-sectional view illustrating a zoom lens according to a first exemplary embodiment of the invention at the wide-angle end (short focal length end). FIGS. 2A, 2B, and 2C are aberration diagrams of the zoom lens according to the first exemplary embodiment of the invention at the wide-angle end, the middle zoom position, and the telephoto end (long focal length end), respectively. FIG. 3 is a lens cross-sectional view illustrating a zoom lens according to a second exemplary embodiment of the invention at the wide-angle end. FIGS. 4A, 4B, and 4C are aberration diagrams of the zoom lens according to the second exemplary embodiment of the invention at the wide-angle end, the middle zoom position, and the telephoto end, respectively.

Figure 5:
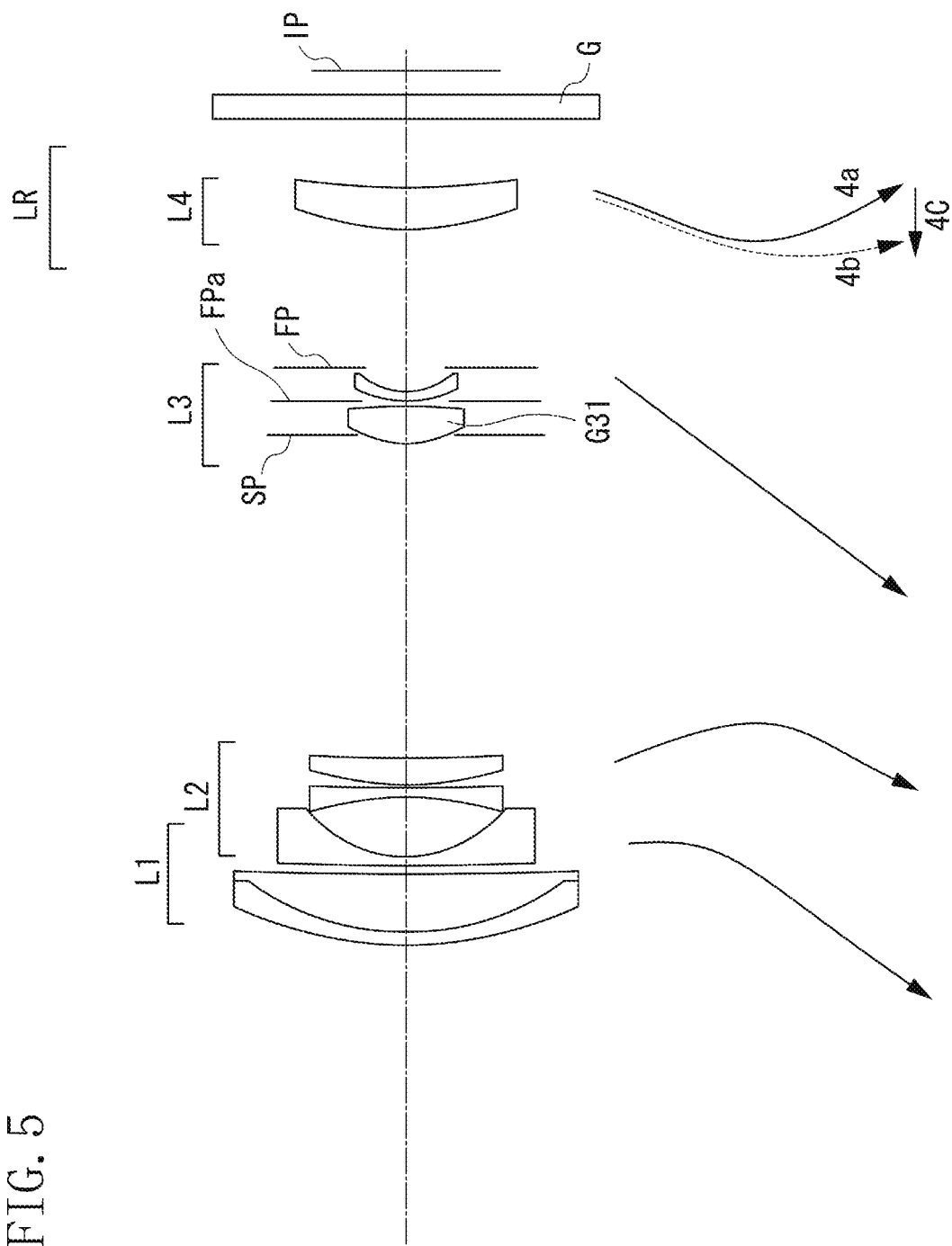
FIG. 5 is a lens cross-sectional view illustrating a zoom lens according to a third exemplary embodiment of the invention at the wide-angle end.
Figure 6A:
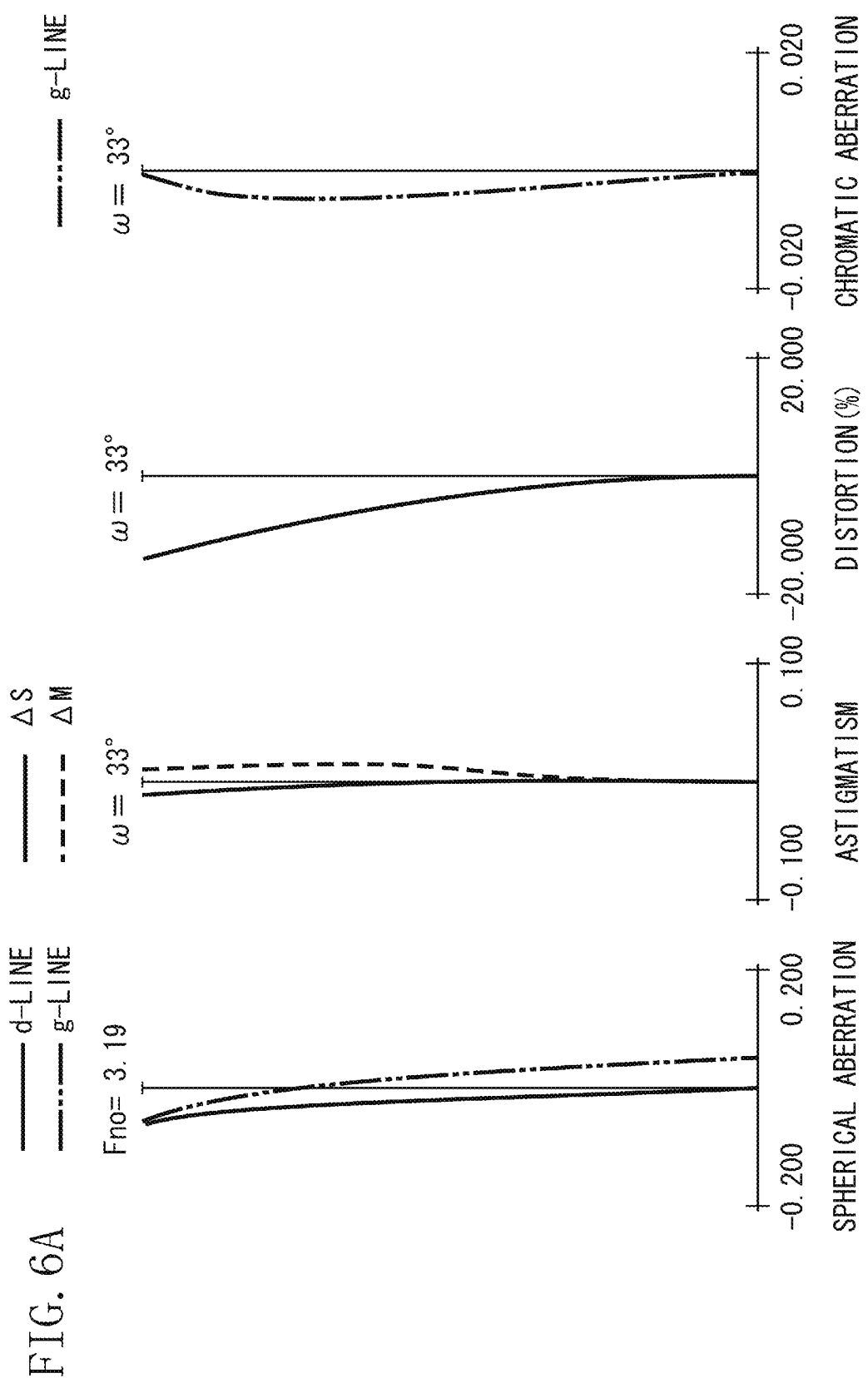
FIGS. 6A, 6B, and 6C are aberration diagrams of the zoom lens according to the third exemplary embodiment of the invention at the wide-angle end, the middle zoom position, and the telephoto end, respectively, in Numerical Example 3.
Figure 6B:
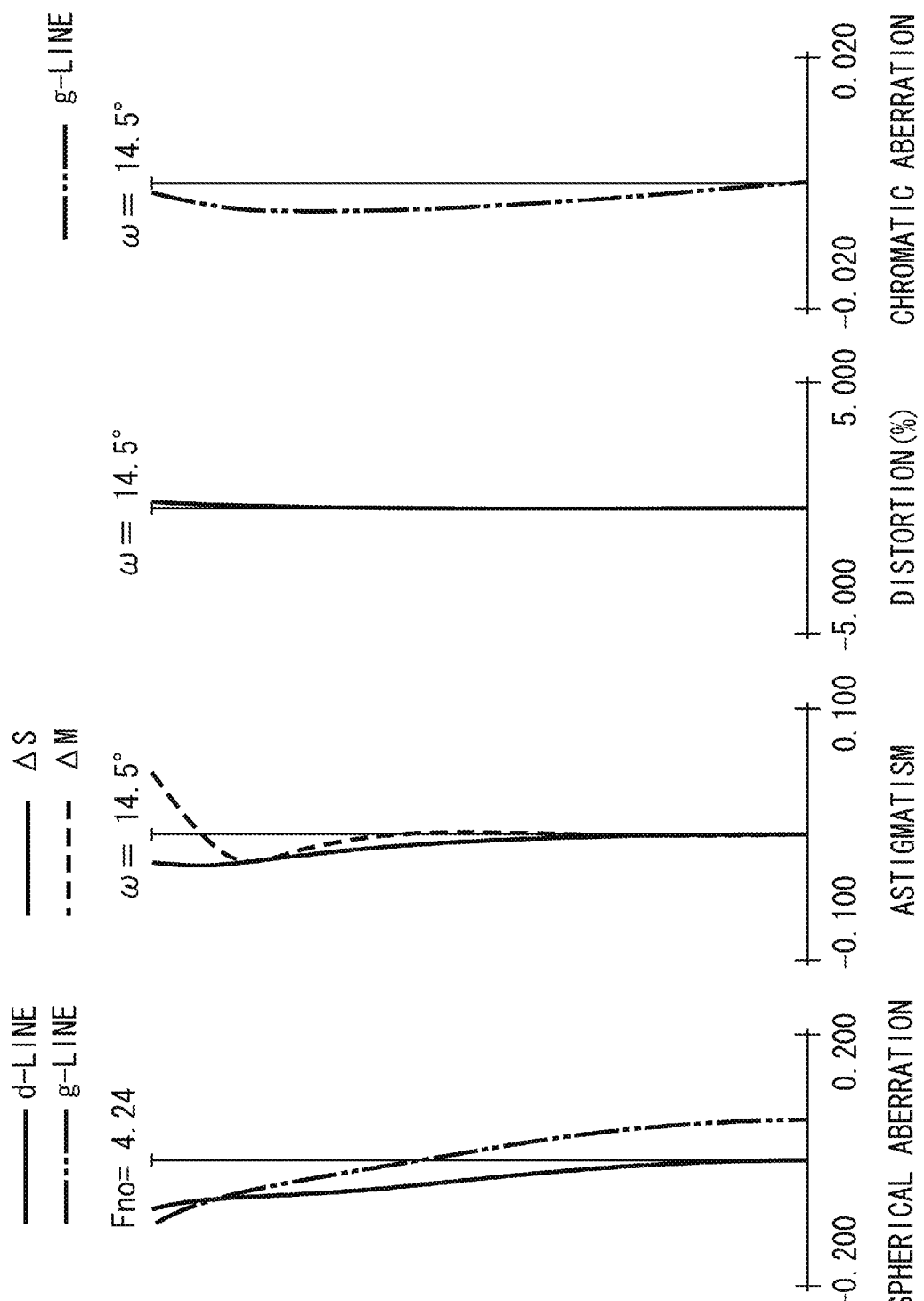
Figure 6C:
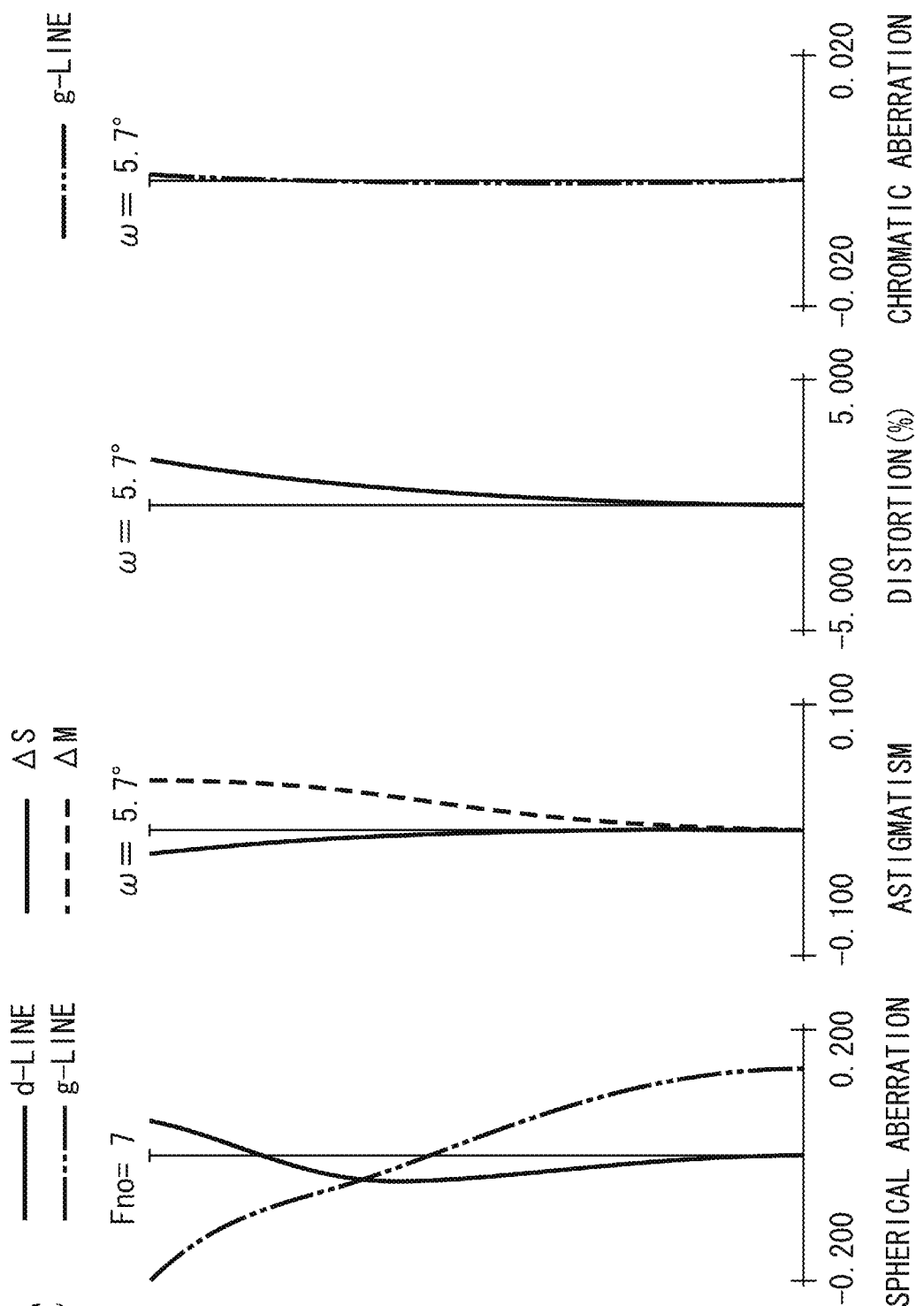
Figure 7:
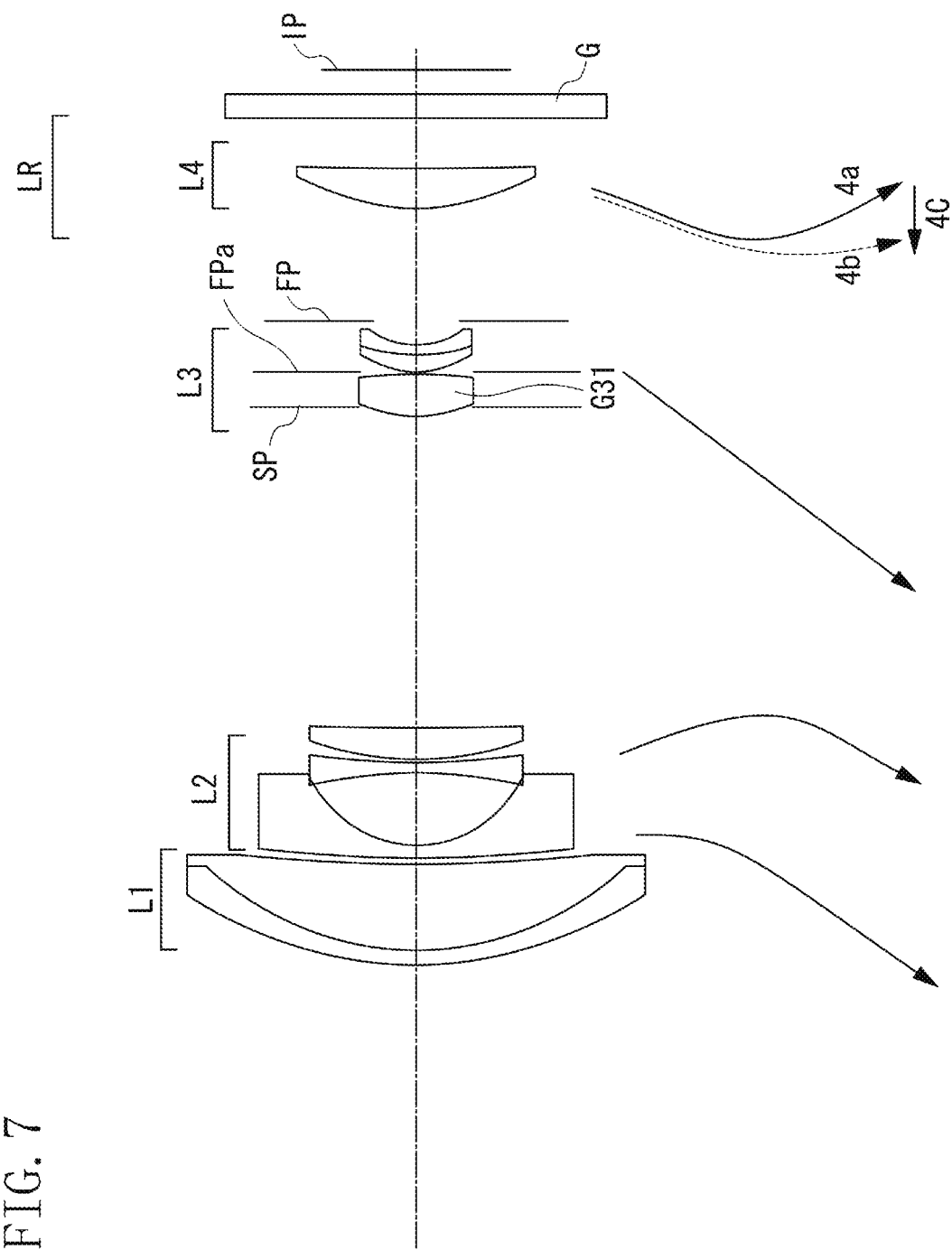
FIG. 7 is a lens cross-sectional view illustrating a zoom lens according to a fourth exemplary embodiment of the invention at the wide-angle end.
Figure 8A:
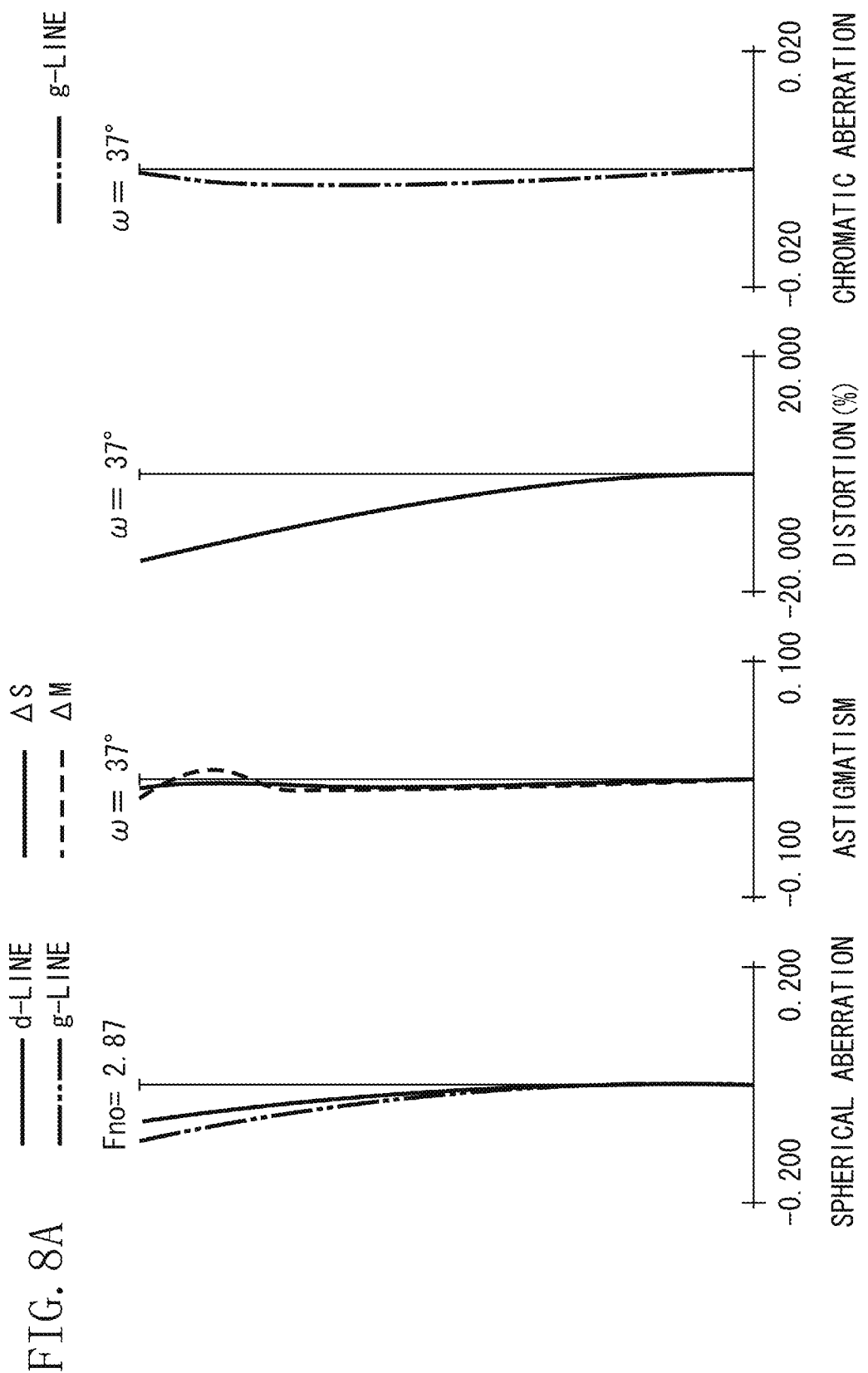
FIGS. 8A, 8B, and 8C are aberration diagrams of the zoom lens according to the fourth exemplary embodiment of the invention at the wide-angle end, the middle zoom position, and the telephoto end, respectively, in Numerical Example 4.
Figure 8B:
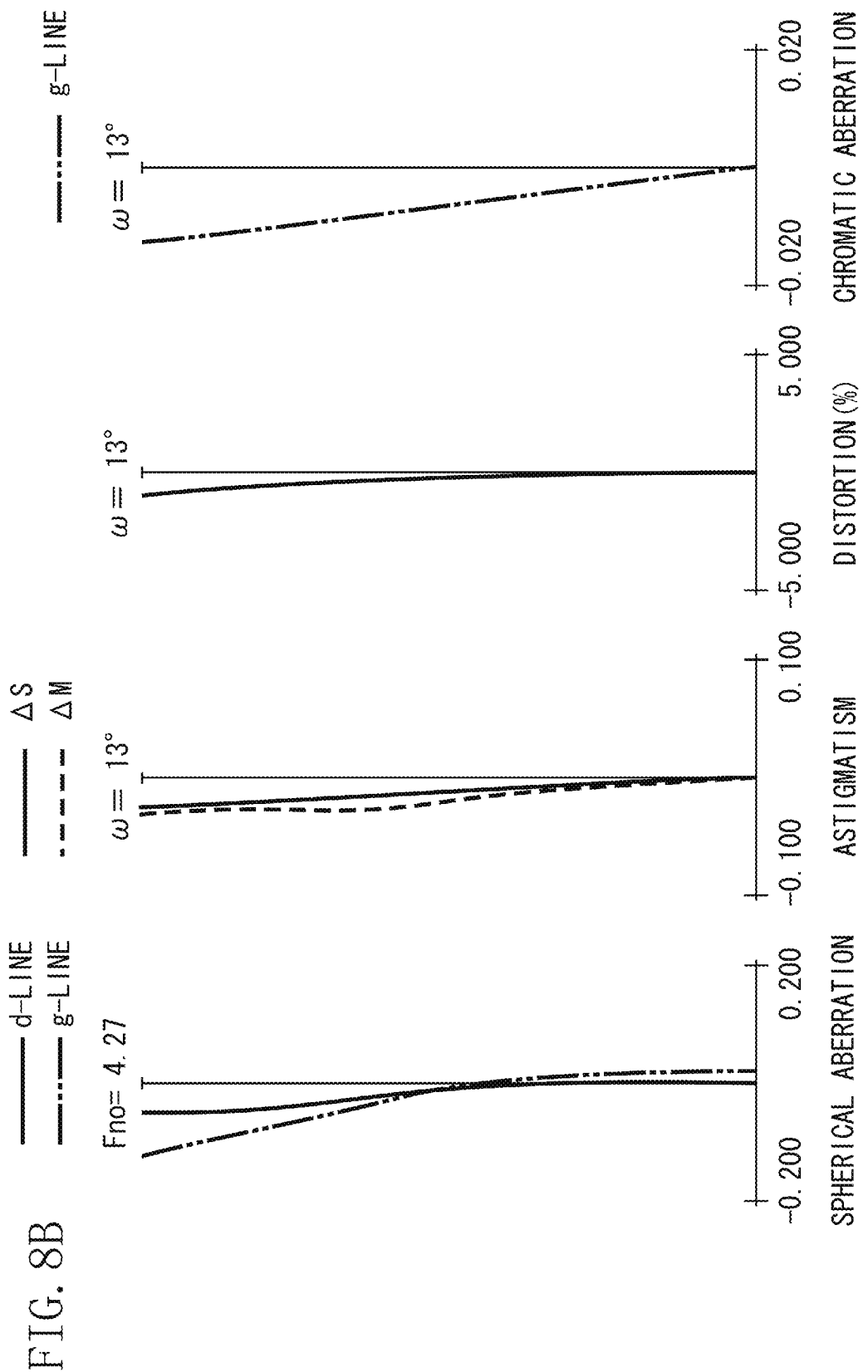
Figure 8C:
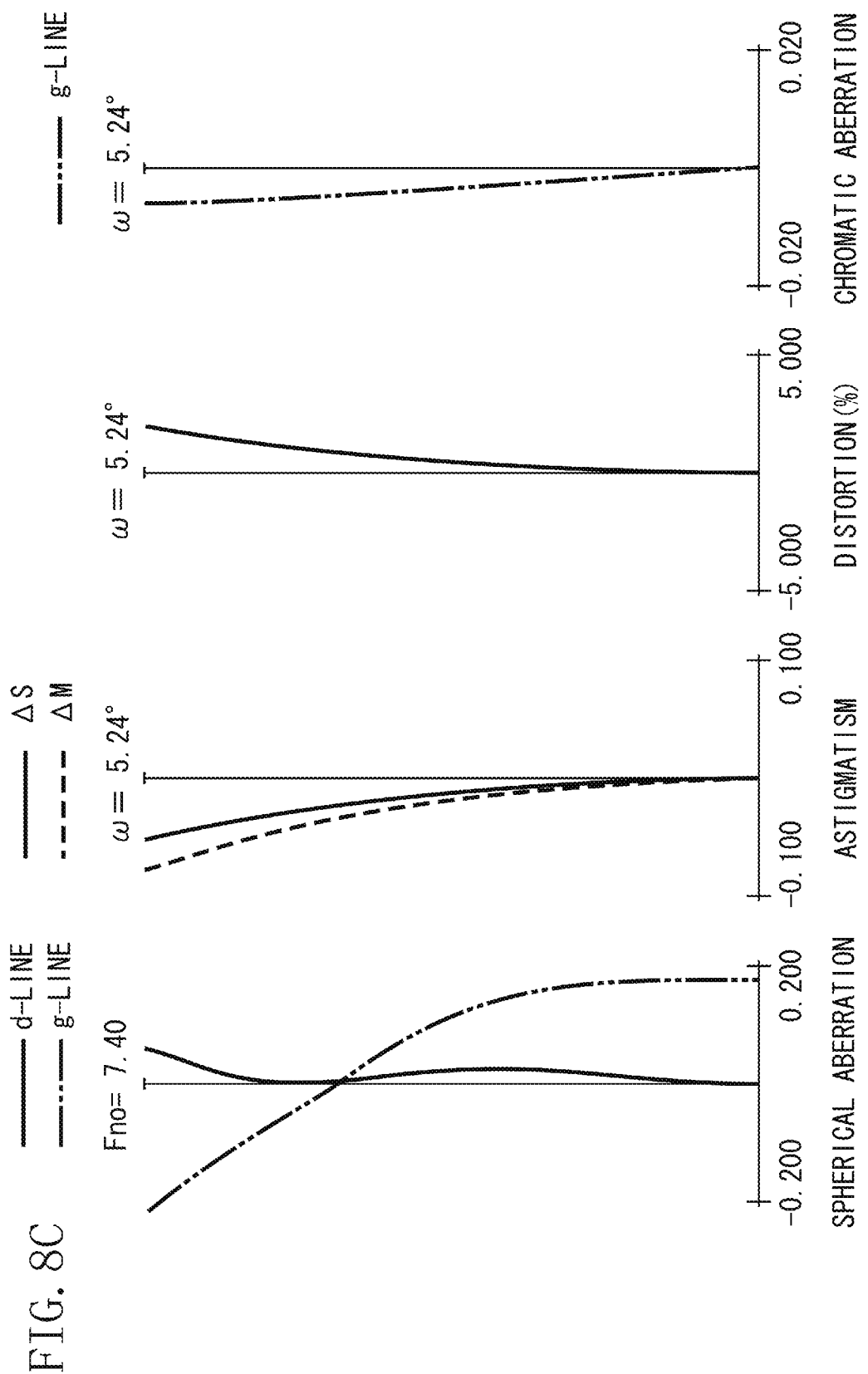

FIG. 5 is a lens cross-sectional view illustrating a zoom lens according to a third exemplary embodiment of the invention at the wide-angle end. FIGS. 6A, 6B, and 6C are aberration diagrams of the zoom lens according to the third exemplary embodiment of the invention at the wide-angle end, the middle zoom position, and the telephoto end, respectively. FIG. 7 is a lens cross-sectional view illustrating a zoom lens according to a fourth exemplary embodiment of the invention at the wide-angle end. FIGS. 8A, 8B, and 8C are aberration diagrams of the zoom lens according to the fourth exemplary embodiment of the invention at the wide-angle end, the middle zoom position, and the telephoto end, respectively.

Figure 9:
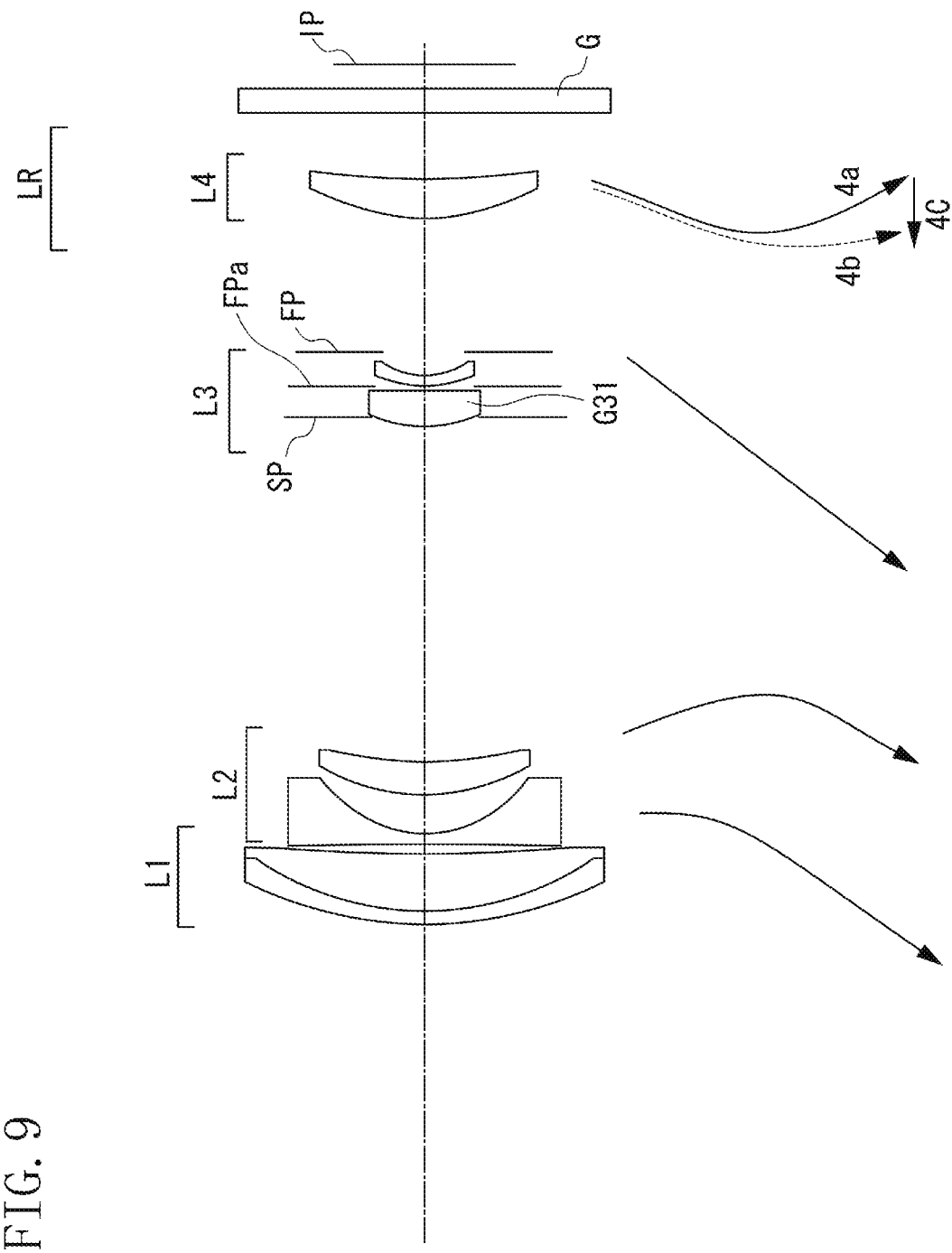
FIG. 9 is a lens cross-sectional view illustrating a zoom lens according to a fifth exemplary embodiment of the invention at the wide-angle end.
Figure 10A:
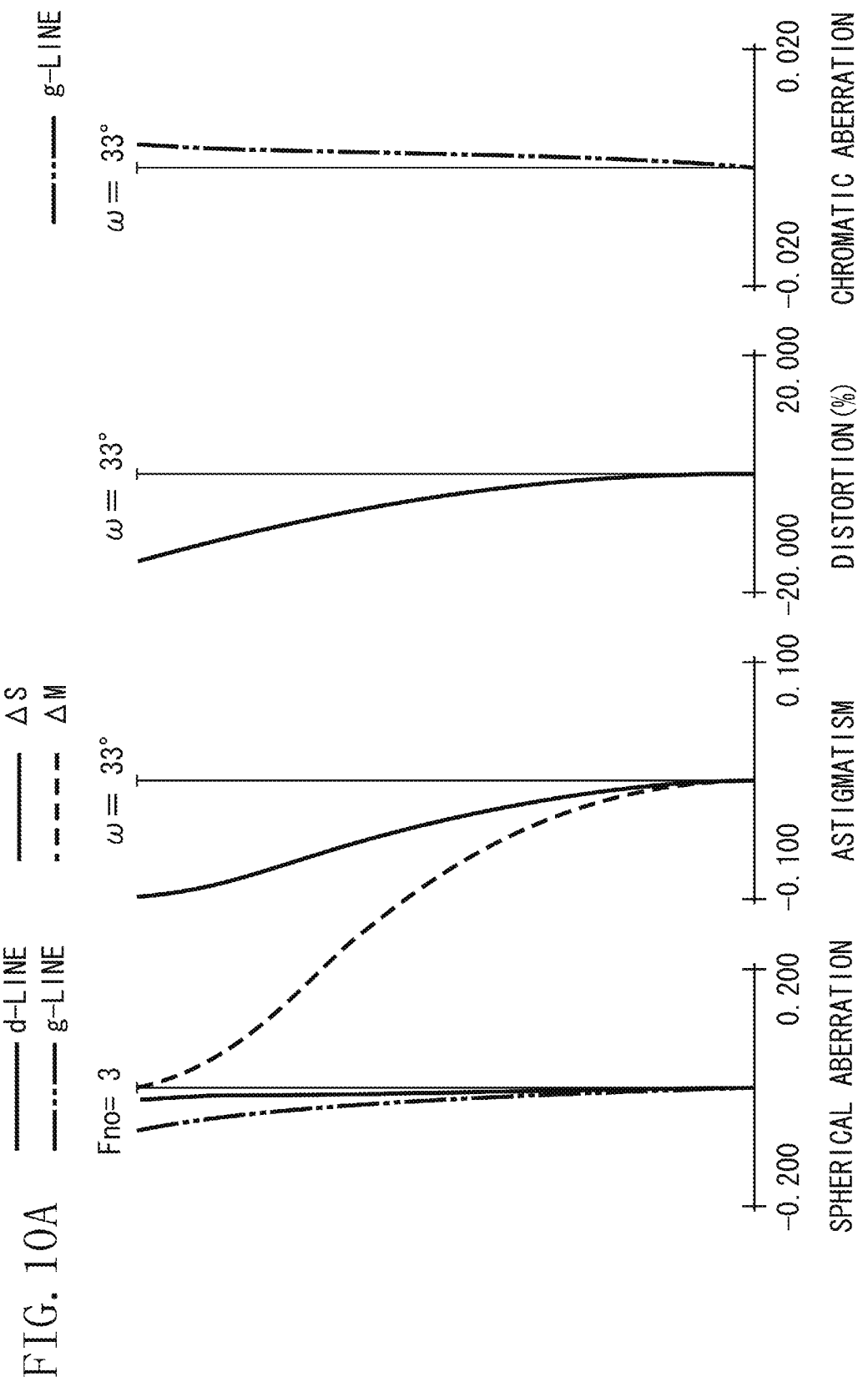
Figure 11:
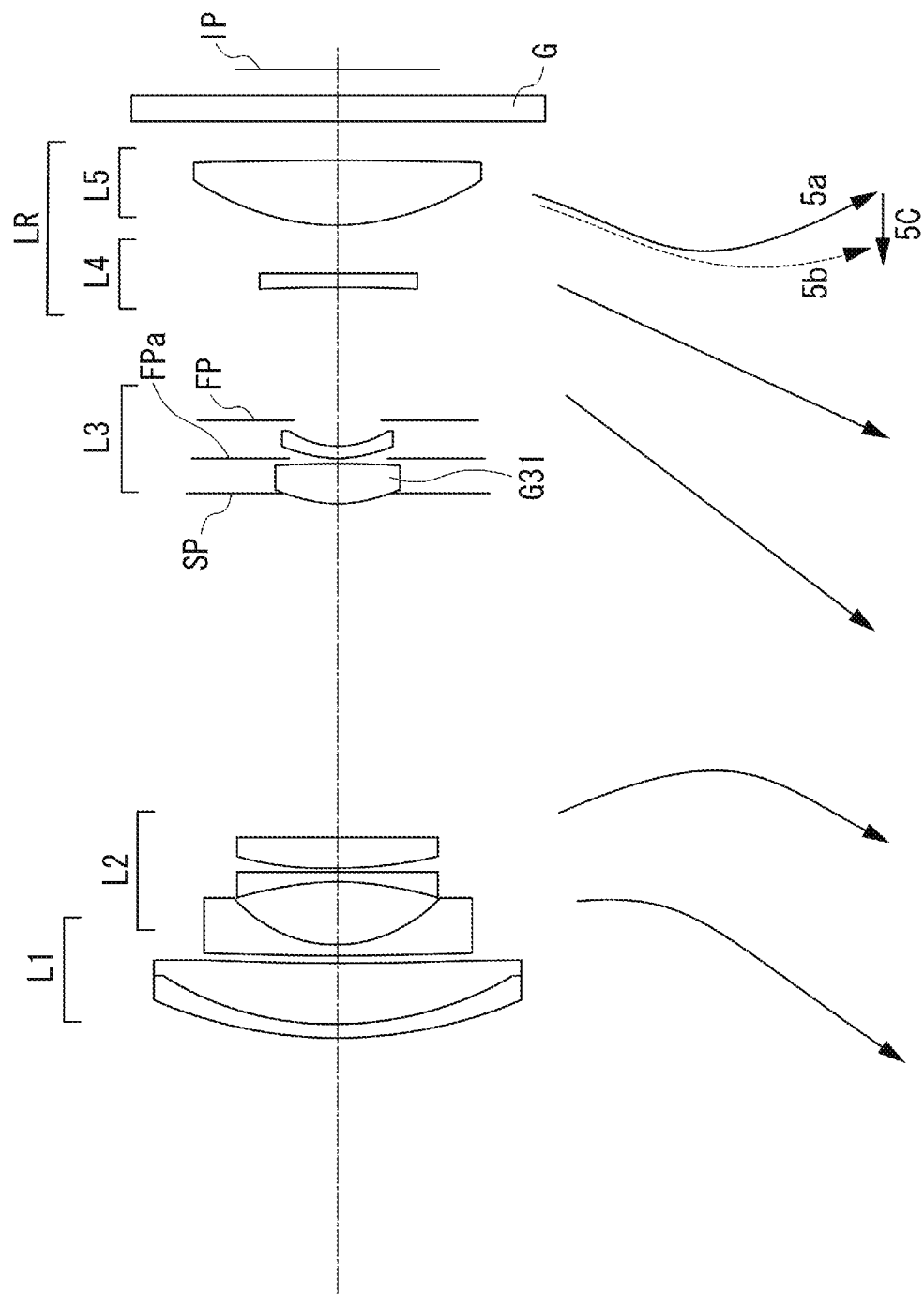
FIG. 11 is a lens cross-sectional view illustrating a zoom lens according to a sixth exemplary embodiment of the invention at the wide-angle end.
Figure 12B:
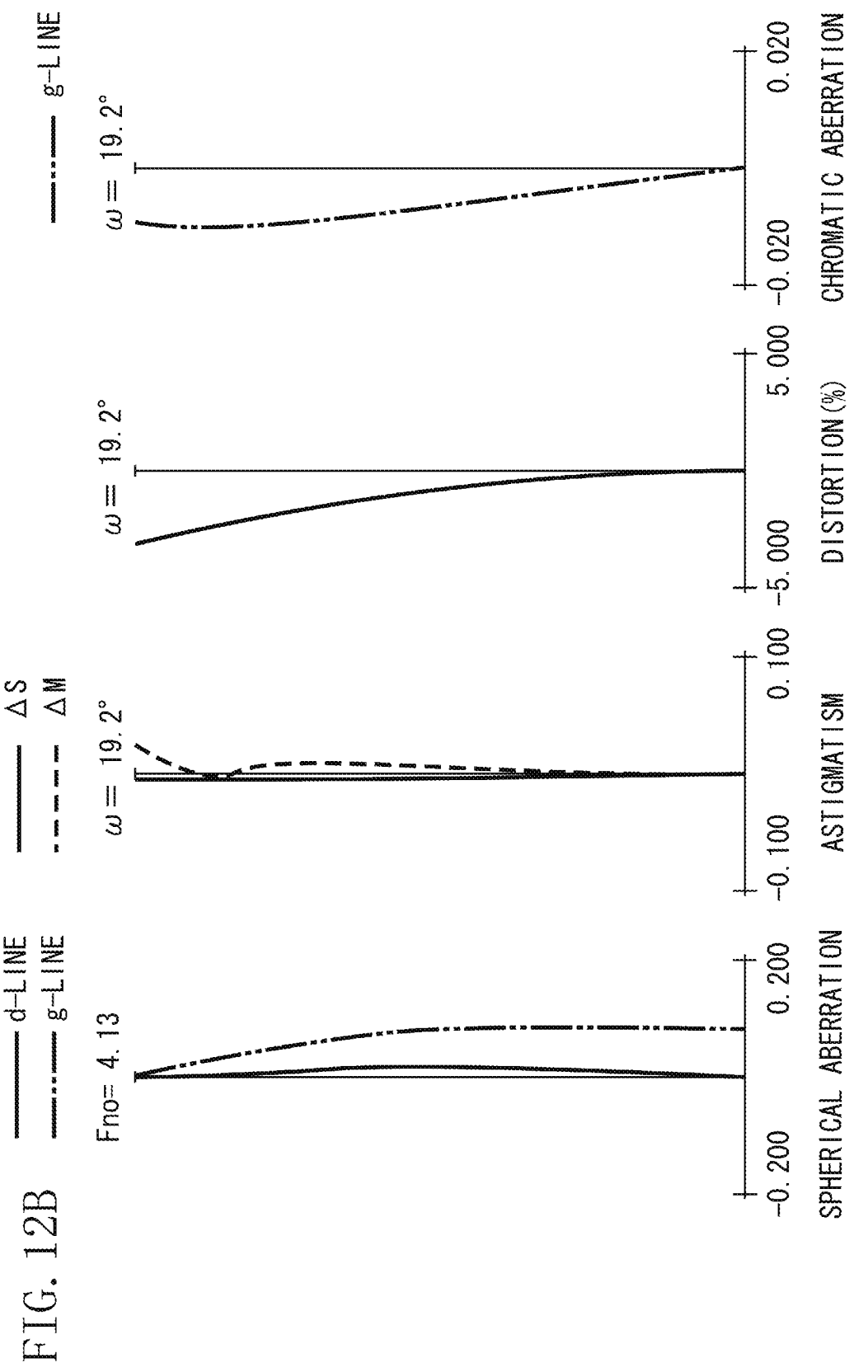
Figure 12C:
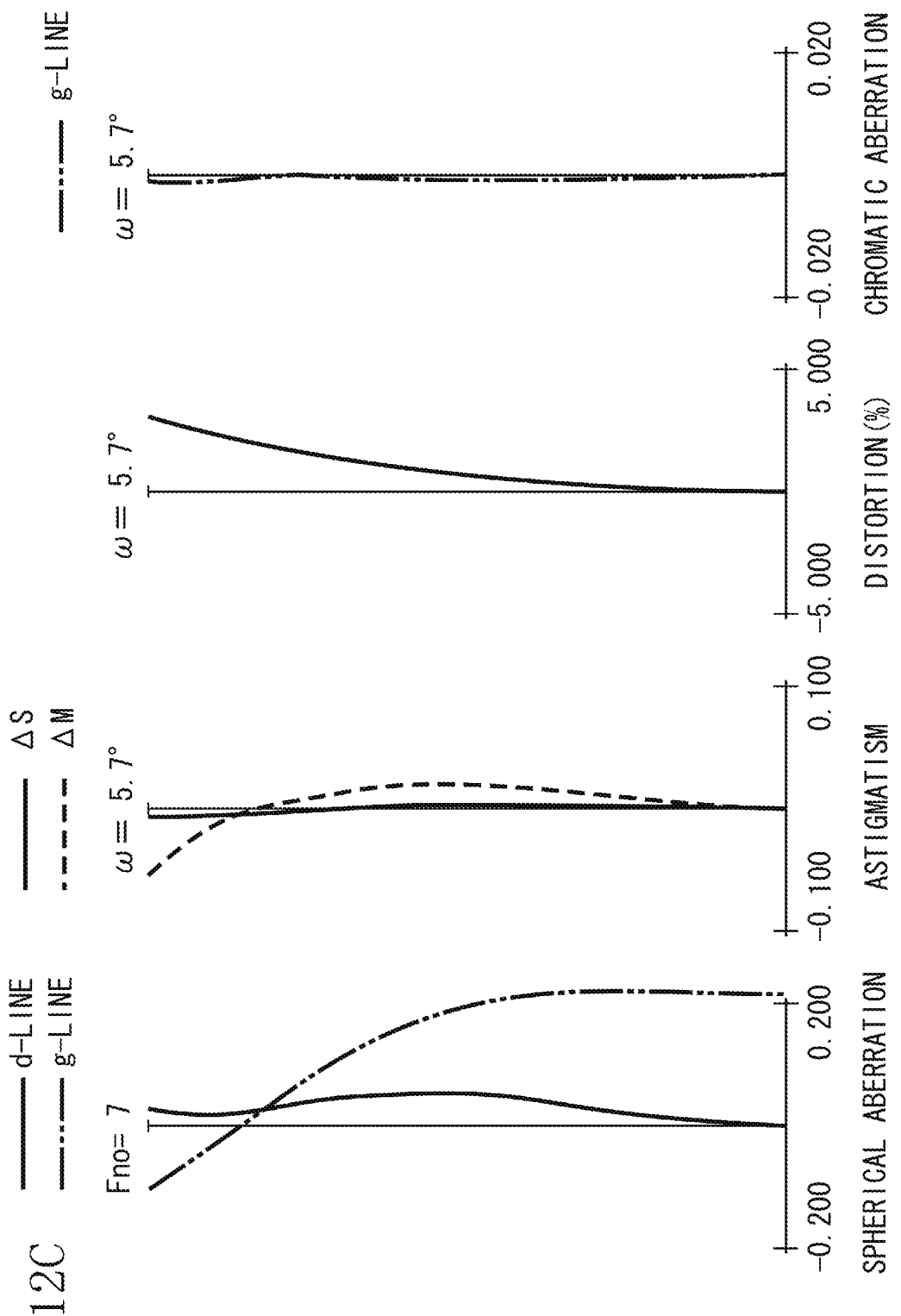

FIG. 9 is a lens cross-sectional view illustrating a zoom lens according to a fifth exemplary embodiment of the invention at the wide-angle end. FIGS. 10A, 10B, and 10C are aberration diagrams of the zoom lens according to the fifth exemplary embodiment of the invention at the wide-angle end, the middle zoom position, and the telephoto end, respectively. FIG. 11 is a lens cross-sectional view illustrating a zoom lens according to a sixth exemplary embodiment of the invention at the wide-angle end. FIGS. 12A, 12B, and 12C are aberration diagrams of the zoom lens according to the sixth exemplary embodiment of the invention at the wide-angle end, the middle zoom position, and the telephoto end, respectively.

Figure 13:
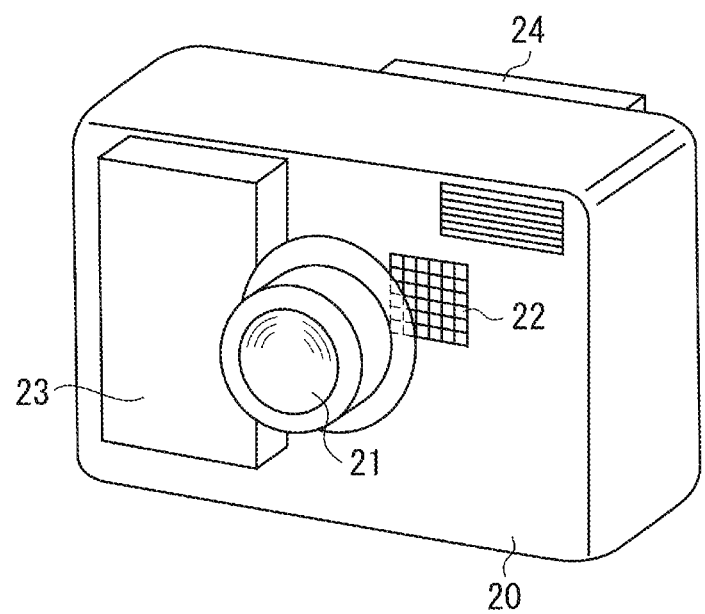
FIG. 13 is a schematic diagram illustrating main parts of an image pickup apparatus according to an exemplary embodiment of the invention.

FIG. 13 is a schematic diagram illustrating main parts of a camera (an image pickup apparatus) equipped with a zoom lens according to an exemplary embodiment of the invention. The zoom lens of each exemplary embodiment is a photographic lens system used in an image pickup apparatus such as a video camera, a digital camera, a TV camera, a monitoring camera, and a silver-halide film camera. In the lens cross-sectional views, the left side refers to an object side (front side), and the right side refers to an image side (rear side). In the lens cross-sectional views, i denotes the order of a lens unit from the object side, Li denotes the i-th lens unit, and LR denotes a rear lens group including one or more lens units.

In the lens cross-sectional views of the first to fifth exemplary embodiments, L1 denotes a first lens unit of a positive refractive power, L2 denotes a second lens unit of a negative refractive power, L3 denotes a third lens unit of a positive refractive power, and L4 denotes a fourth lens unit of a positive refractive power. The first to fifth exemplary embodiments relate to a four-unit zoom lens.

In the lens cross-sectional view of the sixth exemplary embodiment, L1 denotes a first lens unit of a positive refractive power, L2 denotes a second lens unit of a negative refractive power, L3 denotes a third lens unit of a positive refractive power, L4 denotes a fourth lens unit of a negative refractive power, and L5 denotes a fifth lens unit of a positive refractive power. The sixth exemplary embodiment relates to a five-unit zoom lens. In the first to fifth exemplary embodiments, the rear lens group LR includes a single lens unit. In the sixth exemplary embodiment, the rear lens group LR includes two lens units.

In the lens cross-sectional views, an aperture stop SP is arranged in the middle of the third lens unit L3. Alternatively, the aperture stop SP is arranged between an object-side vertex G31a of the lens G31 closest to the object side of the third lens unit L3 and an intersection between an object-side surface of the lens G31 and an outer periphery (edge portion) thereof with respect to the direction of the optical axis. In the lens cross-sectional views, a flare cut stop FP is arranged on the image side of the third lens unit L3 to block undesired light (flare). FPa denotes a fixed stop arranged in the third lens unit L3.

G denotes an optical block such as an optical filter, a phase plate, a crystal low-pass filter, and an infrared cut filter. IP denotes an image plane, which corresponds to an imaging surface of a solid-state image sensor (photoelectric conversion element) such as a CCD sensor or a CMOS sensor when the zoom lens is used as a photographic optical system of a video camera or a digital camera, and corresponds to a photosensitive surface of a film surface when the zoom lens is used in a silver-halide film camera.

In the aberration diagrams, for spherical aberration, the solid line and the two-dotted dashed line denote the Fraunhofer's d-line and the Fraunhofer's g-line, respectively. In the astigmatism charts, ΔM (dashed line) and ΔS (solid line) denote a meridional image plane and a sagittal image plane, respectively. The sagittal image plane and chromatic aberration of magnification are represented by the g-line. ω denotes a half angle of view (degree) (a half of the imaging angle of view), and Fno denotes an F-number. In each exemplary embodiment described below, the wide-angle end and the telephoto end refer to zoom positions when the zoom lens unit is positioned in respective ends within the movable range on an optical axis of a mechanism.

In each exemplary embodiment, during zooming from the wide-angle end to the telephoto end, each lens unit is moved as indicated by the arrows. Specifically, in the first to fifth exemplary embodiments, during zooming from the wide-angle end to the telephoto end, the first lens unit L1 is moved with a locus that is convex towards the image side as indicated by the arrow. The second lens unit L2 is moved with a locus that is convex towards the image side. The third lens unit L3 is moved towards the object side. The fourth lens unit L4 is moved with a locus that is convex towards the object side.

In the sixth exemplary embodiment, during zooming from the wide-angle end to the telephoto end, the first lens unit L1 is moved with a locus that is convex towards the image side as indicated by the arrow. The second lens unit L2 is moved with a locus that is convex towards the image side. The third lens unit L3 is moved towards the object side. The fourth lens unit L4 is moved towards the object side. In addition, the fifth lens unit L5 is moved with a locus that is convex towards the object side.

In each exemplary embodiment, during zooming from the wide-angle and to the telephoto end, both the first and third lens units L1 and L3 are moved towards the object side. As a result, it is possible to reduce the entire lens length (a length from the first lens surface to the image plane) at the wide-angle end, miniaturize the front lens (first lens unit L1), and obtain a high zoom ratio (magnification ratio).

In particular, in each exemplary embodiment, the third lens unit L3 is moved towards the object side during zooming from the wide-angle end to the telephoto end. Therefore, it is possible to allow the third lens unit L3 to have a zooming functionality and obtain a high zoom ratio without excessively increasing the refractive powers of the first and second lens units L1 and L2. In addition, the lens unit closest to the image side is used as a focus lens unit. A rear focus type zoom lens is employed, in which the fourth lens unit L4 in the first to fifth exemplary embodiments or the fifth lens unit L5 in the sixth exemplary embodiment is moved along the optical axis as a focus lens unit.

In the first to fifth exemplary embodiments, focusing is performed from an infinitely-distant object to a close object at the telephoto end by moving the fourth lens unit L4 forward (to the front side) as indicated by the arrow 4c of the lens cross-sectional views. In addition, in the lens cross-sectional views, the solid line curve 4a and the dotted line curve 4b for the fourth lens unit L4 represent movement loci for correcting an image plane variation caused by zooming from the wide-angle end to the telephoto end when focusing is performed for an infinitely-distant object and a close object, respectively.

In the sixth exemplary embodiment, focusing is performed by moving the fifth lens unit L5 forward (to the front side) as indicated by the arrow 5c of the lens cross sectional view. In addition, the solid line curve 5a and the dotted line curve 5b for the fifth lens unit L5 in the lens cross-sectional views represent movement loci for correcting an image plane variation caused by zooming from the wide-angle end to the telephoto end when focusing is performed for an infinitely-distant object and a close object, respectively. However, in the sixth exemplary embodiment, focusing may be performed using the fourth lens unit L4 of a negative refractive power.

In this case, the movement locus of the fourth lens unit L4 is set as described below in comparison with the first to fifth exemplary embodiments. When focusing is performed from an infinitely-distant object to a close object at the telephoto end, the fourth lens unit L4 is moved towards the image side, which is opposite to the arrow 4c. In addition, when focusing is performed for an infinitely-distant object and a close object, the movement loci of the fourth lens unit L4 are set as the arrows 4a and 4b, respectively, which are opposite to those of the first to fifth exemplary embodiments.

In each exemplary embodiment, during zooming (variation of magnification) from the wide-angle end to the telephoto end, all of the first, second, and third lens units L1, L2, and L3 are moved towards the object side. As a result, it is possible to reduce the front lens diameter (an effective diameter of the first lens unit) and obtain a high zoom ratio. In addition, since the first lens unit includes a positive lens and a negative lens, it is possible to reduce the front lens diameter, reduce the size of the camera, and appropriately correct axial chromatic aberration of magnification across the entire zoom range.

In particular, by appropriately setting the movement amount of each lens unit during zooming from the wide-angle end to the telephoto end, it is possible to effectively use a space of the retractable lens barrel, reduce the camera in size and thickness at the time of retraction, and obtain a high zoom ratio.

In each exemplary embodiment, the following conditions are satisfied:

$$0.5 < M2/fw < 5.0 \quad (1), \text{ and}$$

$$0.1 < M1/M3 < 1.0 \quad (2),$$

where M1, M2, and M3 denote movement amounts (differences between positions of the lens unit at the wide-angle end and the telephoto end) of the first, second, and third lens units L1, L2, and L3, respectively, for zooming from the wide-angle end to the telephoto end, and fw denotes a focal length of the entire zoom lens at the wide-angle end. In this case, the sign of the movement amount is set to be positive when each lens unit is moved towards the object side.

The condition (1) is to appropriately set the focal length fw of the entire zoom lens at the wide-angle end and the movement amount of the second lens unit L2 during zooming from the wide-angle end to the telephoto end in order to reduce a thickness of the lens barrel at the time of retraction and obtain a wide angle of view and a high zoom ratio. If the movement amount of the second lens unit L2 decreases relative to the focal length fw of the entire zoom lens at the wide-angle end with the lower limit of the condition (1) exceeded, it is necessary to increase the power (hereinafter, set as an inverse of the focal length) of the second lens unit L2 in order to obtain a wide angle of view and a high zoom ratio. As a result, it is difficult to correct curvature of field and chromatic aberration of magnification, mostly, in the vicinity of the wide-angle end.

If the movement amount of the second lens unit L2 increases relative to the focal length fw of the entire zoom lens at the wide-angle end with the upper limit of the condition (1) exceeded, the movement amount of the second lens unit L2 at the time of retraction is restricted, so that it is difficult to reduce a thickness of the camera.

The condition (2) is to appropriately set the movement amounts of the first and third lens units L1 and L3 during zooming from the wide-angle end to the telephoto end in order to reduce a thickness of the lens barrel at the time of retraction and reduce the front lens diameter. If the lower limit of the condition (2) is exceeded, it is necessary to increase a distance between the second and third lens units L2 and L3 at the wide-angle end in order to obtain a movement amount of the third lens unit L3. As a result, the diameter of a light flux incident on the third lens unit L3 at the wide-angle end increases, so that it is difficult to correct coma and chromatic aberration of magnification at the wide-angle end. Furthermore, the effective diameter of the third lens unit L3 increases, so that it is difficult to reduce the size of the lens barrel.

In addition, the movement amount of the first lens unit L1 is excessively reduced, and the variable power effect of the first lens unit L1 decreases, so that it is difficult to obtain a high zoom ratio. Since the power of the first lens unit L1 increases to obtain a high zoom ratio, in manufacturing, and the thickness of the first lens unit L1 increases to obtain a lens edge, the front lens diameter accordingly increases, and it is difficult to obtain a compact camera.

If the upper limit of the condition (2) is exceeded, the movement amount of the first lens unit L1 excessively increases, so that it is difficult to obtain a high zoom ratio while the entire optical length (the length from the first lens surface to the last lens surface) is suppressed. In addition, since the movement amount of the third lens unit L3 excessively decreases, it is necessary to increase the refractive power of the third lens unit L3 to obtain a high zoom ratio. As a result, it is difficult to appropriately correct coma and curvature of field across the entire zoom range. More usefully, the numerical ranges of the conditions (1) and (2) are set as follows:

$$0.5 < M2/fw < 4.0 \quad (1a)$$

$$0.30 < M1/M3 < 0.99 \quad (2a)$$

More usefully, the numerical ranges of the conditions (1a) and (2a) are set as follows:

$$0.5 < M2/fw < 3.5 \quad (1b)$$

$$0.40 < M1/M3 < 0.99 \quad (2b)$$

In this configuration, it is possible to obtain a thin and compact zoom lens having excellent optical performance across the entire zoom range with a wide angle of view and a high zoom ratio.

According to an exemplary embodiment of the present invention, more usefully, at least one of the following conditions are satisfied:

$$1.85 < Nd1n < 2.50 \quad (3),$$

$$5.0 < vd1n < 21.0 \quad (4),$$

$$1.50 < Nd3p < 2.50 \quad (5),$$

$$40.0 < vd3p < 72.0 \quad (6),$$

$$15.0 < vd1p - vd1n < 40.0 \quad (7),$$

$$0.7 < \beta ft/\beta fw < 1.3 \quad (8),$$

$$2.0 < \beta 3t/\beta 3w < 10.0 \quad (9),$$

$$2.0 < D3p/D3n < 8.0 \quad (10), \text{ and}$$

$$0.2 < f1p/f1 < 1.0 \quad (11),$$

where $Nd1n$ and $vd1n$ denote a refractive index and an Abbe number, respectively, of a material of a negative lens included in the first lens unit L1, $Nd3p$ and $vd3p$ denote a refractive index and an Abbe number, respectively, of a material of a positive lens included in the third lens unit L3, $vd1p$ denotes an Abbe number of a material of a positive lens included in the first lens unit L1, a lens unit closest to the image side of the zoom lens is used as a focus lens unit, $\beta fw$ and $\beta ft$ denote lateral magnifications of the focus lens unit at the wide-angle end and the telephoto end, respectively, $\beta 3w$ and $\beta 3t$ denote lateral magnifications of the third lens unit L3 at the wide-angle end and the telephoto end, respectively, $D3p$ denotes a maximum thickness of the positive lens included in the third lens unit L3, $D3n$ denotes a minimum thickness of a negative lens included in the third lens unit L3, $f1p$ denotes a focal length of a positive lens included in the first lens unit L1, and $f1$ denotes a focal length of the first lens unit L1.

The conditions (3) and (4) are to appropriately set a refractive index $Nd1n$ and an Abbe number $d1n$ of a material of the negative lens included in the first lens unit L1 to reduce the entire zoom lens in size and thickness and obtain a high zoom ratio.

If the refractive index $Nd1n$ of a material of the negative lens included in the first lens unit L1 decreases with the lower limit of the condition (3) exceeded, the front lens diameter increases, which is not desirable. If the refractive index $Nd1n$ of a material of the negative lens of the first lens unit L1 increases with the upper limit of the condition (3) exceeded, the Petzval sum (the sum of focal lengths of the lenses in the lens unit multiplied by inverses of refractive indices) of the first lens unit L1 of a positive refractive power increases in a positive direction. For this reason, it is difficult to correct curvature of field. In addition, it is difficult to correct chromatic aberration across the entire zoom range.

If the Abbe number $vd1n$ of a material of the negative lens included in the first lens unit L1 decreases with the lower limit of the condition (4) exceeded, the positive lens of the first lens unit L1 typically includes a glass material having a high refractive index to remove axial chromatic aberration in the vicinity of the telephoto end. Then, the Petzval sum of the first lens unit L1 of a positive refractive power excessively decreases, so that it is difficult to correct curvature of field.

If the Abbe number $d1n$ of a material of the negative lens included in the first lens unit L1 increases with the upper limit of the condition (4) exceeded, the material of the positive lens included in the first lens unit L1 includes a glass material having a low refractive index in order to remove axial chromatic aberration in the vicinity of the telephoto end. Then, it is necessary to increase the thickness of the positive lens to obtain a lens edge thickness of the positive lens. Accordingly, the effective diameter also increases, so that it is difficult to achieve miniaturization.

The conditions (5) and (6) are to appropriately set the refractive index $Nd3p$ and the Abbe number $vd3p$ of a material of the positive lens of the positive lens the third lens unit L3 to reduce the entire zoom lens in size and thickness and obtain a high zoom ratio. If the refractive index $Nd3p$ of a material of the positive lens of the positive lens the third lens unit L3 decreases with the lower limit of the condition (5) exceeded, it is necessary to increase the thickness of the positive lens to obtain a lens edge thickness thereof. As a result, the thickness of the third lens unit L3 increases, so that it is difficult to obtain a thin thickness. In addition, since the curvature of the lens surface increases, it is difficult to correct spherical aberration, mostly, in the vicinity of the telephoto end.

If the refractive index Nd3p of a material of the positive lens of the positive lens the third lens unit L3 increases with the upper limit of the condition (5) exceeded, the Petzval sum of the third lens unit L3 of a positive refractive power excessively decreases, so that it is difficult to correct curvature of field. In addition, it is difficult to correct chromatic aberration across the entire zoom range.

If the Abbe number νd3p of a material of the positive lens of the positive lens the third lens unit L3 decreases with the lower limit of the condition (6) exceeded, it is difficult to correct axial chromatic aberration, mostly, in the vicinity of the telephoto end. If the Abbe number νd3p of a material of the positive lens of the positive lens the third lens unit L3 increases with the upper limit of the condition (6) exceeded, it is necessary to increase the thickness of the positive lens to obtain a lens edge thickness thereof because it typically includes a glass material having a low refractive index. Therefore, the thickness of the third lens unit L3 increases, so that it is difficult to provide a thin thickness.

In addition, since the curvature of the lens surface increases, it is difficult to correct spherical aberration, mostly, in the vicinity of the telephoto end. Furthermore, generally, a material of the negative lens of the positive lens the third lens unit L3 includes a glass material having a small Abbe number to remove axial chromatic aberration and chromatic spherical aberration in the vicinity of the telephoto end. Therefore, it is difficult to remove chromatic aberration when the third lens unit L3 includes a small number of lenses.

The condition (7) is to appropriately set the Abbe number νd1p of a material of the positive lens and the Abbe number νd1n of a material of the negative lens of the positive lens the first lens unit L1 to reduce the entire zoom lens in size and thickness and obtain a high zoom ratio.

If a difference between the Abbe number νd1p of a material of the positive lens of the positive lens the first lens unit L1 and the Abbe number νd1n of a material of the negative lens decreases with the lower limit of the condition (7) exceeded, it is difficult to remove axial chromatic aberration, generally, in the vicinity of the telephoto end. In addition, since the curvature of the lens surface increases in the positive and negative lenses, the thickness of the lens increases to obtain an edge thickness of the positive lens, and the front lens diameter increases, so that it is difficult to achieve miniaturization.

If a difference between the Abbe number νd1p of a material of the positive lens of the positive lens the first lens unit L1 and the Abbe number νd1n of a material of the negative lens increases with the upper limit of the condition (7) exceeded, generally, the positive lens includes a glass material having a low refractive index to remove axial chromatic aberration in the vicinity of the telephoto end. For this reason, a thickness of the lens increases to obtain a lens edge thickness, and the front lens diameter increases, so that it is difficult to achieve miniaturization.

In this case, it is desirable that the Abbe number νd1p satisfies the following condition:

$$30 < \nu d1p < 55 \quad (7x)$$

The condition (8) is to appropriately set a ratio between the lateral magnifications βft and βfw of the focus lens unit at the wide-angle end and the telephoto end to reduce the entire zoom lens in size and thickness and obtain a high zoom ratio. If the lateral magnification βft of the focus lens unit at the telephoto end decreases relative to the lateral magnification βfw at the wide-angle end with the lower limit of the condition (8) exceeded, the entire lens length increases to obtain a back focus for a high zoom ratio, so that it is difficult to obtain a thin thickness.

If the lateral magnification βft at the telephoto end increases relative to the lateral magnification βfw at the wide-angle end with the upper limit of the condition (8) exceeded, the movement amount of the focus lens unit increases. For this reason, the movement amount of the focus lens unit at the time of retraction is restricted, so that it is difficult to obtain a thin thickness.

The condition (9) is to appropriately set a ratio between the lateral magnifications β3t and β3w of the third lens unit L3 at the wide-angle end and the telephoto end in order to reduce the entire zoom lens in size and thickness and obtain a high zoom ratio. If the lateral magnification β3t at the telephoto end decreases relative to the lateral magnification β3w at the wide-angle end with the lower limit of the condition (9) exceeded, a variable power contribution of the third lens unit L3 decreases, so that it is difficult to achieve miniaturization and a high magnification ratio.

If the lateral magnification β3t at the telephoto end increases relative to the lateral magnification β3w at the wide-angle end with the upper limit of the condition (9) exceeded, a variable power contribution of the third lens unit L3 increases, and accordingly, the movement amount of the third lens unit L3 during zooming increases. For this reason, since the movement amount is restricted, it is difficult to obtain a thin thickness at the time of retraction. In addition, coma increases, mostly, in the middle zoom range.

The condition (10) is to appropriately set a maximum thickness D3p of a positive lens included in the third lens unit L3 and a minimum thickness D3n of a negative lens included in the third lens unit L3 to reduce the entire zoom lens in size and thickness and obtain a high zoom ratio. If the maximum thickness D3p of the positive lens included in the third lens unit L3 decreases relative to the minimum thickness D3n of the negative lens with the lower limit of the condition (10) exceeded, it is difficult to correct chromatic aberration across the entire zoom range. In addition, generally, the minimum thickness D3n of the negative lens increases, and the thickness of the third lens unit L3 increases, so that it is difficult to obtain a thin thickness at the time of retraction.

If the maximum thickness D3p of the positive lens included in the third lens unit L3 increases relative to the minimum thickness D3n of the negative lens with the upper limit of the condition (10) exceeded, it is difficult to correct coma, mostly, from the middle zoom range at the telephoto end. In addition, generally, since the thickness D3n of the negative lens is excessively reduced, this makes manufacturing difficult, and it is difficult to satisfy thickness tolerance and surface accuracy for maintaining excellent optical performance.

The condition (11) is to appropriately set a ratio between the focal length f1p of the positive lens included in the first lens unit L1 and the focal length f1 of the first lens unit L1 to reduce the entire zoom lens in size and thickness and obtain a high zoom ratio.

If the focal length f1p of the positive lens of the first lens unit L1 decreases relative to the focal length f1 of the first lens unit L1 with the lower limit of the condition (11) exceeded, it is necessary to increase the thickness in order to obtain an edge thickness of the positive lens. As a result, the thickness and the effective diameter of the first lens unit L1 increases, so that it is difficult to achieve miniaturization. In addition, mostly, chromatic aberration of magnification in the vicinity of the wide-angle end and axial chromatic aberration in the vicinity of the telephoto end are deteriorated, which is not desirable.

If the focal length f1p of the positive lens of the first lens unit L1 increases relative to the focal length f1 of the first lens unit L1 with the upper limit of the condition (11) exceeded, it is difficult to correct spherical aberration, mostly, in the vicinity of the telephoto end, which is not desirable. In addition, generally, since the entire lens length increases at the telephoto end, it is difficult to achieve miniaturization.

In order to further miniaturize the entire zoom lens while correcting aberration and reducing an aberration variation during zooming, it is desirable that the numerical ranges of the conditions (3) to (11) be set as follows:

$$1.90 < Nd1n < 2.50 \quad (3a)$$

$$10.0 < d1n < 20.8 \quad (4a)$$

$$1.50 < Nd3p < 2.10 \quad (5a)$$

$$45.0 < vd3p < 71.8 \quad (6a)$$

$$18.0 < d1p - d1n < 35.0 \quad (7a)$$

$$0.75 < \beta ft/\beta fw < 1.20 \quad (8a)$$

$$2.2 < \beta 3t/\beta 3w < 5.0 \quad (9a)$$

$$2.2 < D3p/D3n < 6.0 \quad (10a)$$

$$0.4 < f1p/f1 < 0.9 \quad (11a)$$

More usefully, the second lens unit L2 includes a negative lens, a negative lens, and a positive lens in order from the object side to the image side.

More usefully, the third lens unit L3 includes a positive lens and a negative lens in order from the object side to the image side. In each exemplary embodiment, an image can be displaced in a direction perpendicular to the optical axis by moving the third lens unit L3 of a positive refractive power to have a component perpendicular to the optical axis. As a result, it is possible to correct a shake of a photographed image generated when the entire optical system (zoom lens) is vibrated (tilted) (it is possible to perform image stabilization).

In each exemplary embodiment, since image stabilization is performed without newly adding an optical member such as a variable angle prism or a lens unit for image stabilization, it is possible to prevent the entire zoom lens from increasing in size.

Although image stabilization is performed by moving the third lens unit L3 in a direction perpendicular to the optical axis in each exemplary embodiment, an image shake may be corrected by moving the third lens unit L3 to have a component perpendicular to the optical axis. For example, if a lens barrel is allowed to have a complicated structure, image stabilization may be performed by rotating the third lens unit L3 such that the rotation center is positioned on the optical axis. In addition, image stabilization may be performed using a part of the lenses of the third lens unit L3.

It is desirable that the first lens unit L1 be thin in order to reduce an effective lens diameter of the first lens unit L1 and reduce a thickness of the camera when each lens unit is retracted. For this reason, it is desirable that the number of lenses of the first lens unit L1 be reduced. For this reason, in each exemplary embodiment, the first lens unit L1 includes a cemented lens obtained by cementing a negative lens and a positive lens in order from the object side to the image side.

As a result, it is possible to reduce a thickness of the zoom lens when each lens unit is stored and reduce a thickness of the camera. Furthermore, if the first lens unit L1 is configured in this manner, it is possible to appropriately correct chromatic aberration in the vicinity of the telephoto end.

The second lens unit L2 includes at least one negative lens and one positive lens. Specifically, in the first to fourth and sixth exemplary embodiments, the second lens unit L2 includes three independent lenses including negative, negative, and positive lenses in order from the object side to the image side. In the fifth exemplary embodiment, the second lens unit L2 includes two independent lenses including negative and positive lenses in order from the object side to the image side.

The third lens unit L3 includes one positive lens and one negative lens. Specifically, in the first to third, fifth, and sixth exemplary embodiment, the third lens unit L3 includes a positive lens and a meniscus-shaped negative lens in order from the object side to the image side. As a result, it is possible to appropriately correct coma at the middle zoom position, mostly, caused by image stabilization and zooming.

In the fourth exemplary embodiment, the third lens unit L3 includes a positive lens and a cemented lens obtained by cementing a positive lens and a meniscus-shaped negative lens in order from the object side to the image side. The third lens unit L3 has one or more aspheric surfaces. As a result, it is possible to appropriately correct a variation of spherical aberration, mostly, caused by zooming.

In the first to fifth exemplary embodiments, the fourth lens unit L4 includes one positive lens. In the sixth exemplary embodiment, the fourth lens unit L4 includes one negative lens, and the fifth lens unit L5 includes one positive lens. As a result, it is possible to achieve simplification and obtain a thin thickness at the time of retraction.

According to each exemplary embodiment, with the aforementioned configuration, it is possible to miniaturize the entire zoom lens, reduce a thickness of the camera at the time of retraction, and obtain excellent optical performance across the entire zoom range with a wide angle of view and a high zoom ratio.

Next, Numerical Examples 1 to 6 corresponding to the first to sixth exemplary embodiments of the invention will be described. In each numerical example, i denotes the order of an optical surface from the object side, ri denotes a radius of curvature of the i-th surface, di denotes a distance between the i-th surface and the (i+1)th surface, and ndi and vdi denote a refractive index and an Abbe number, respectively, of a material of the i-th optical member with respect to the d-line.

When k denotes a conic constant, A4, A6, A8, and A10 denote aspheric coefficients, and a displacement in the optical axis direction at the position having a height h from an optical axis is indicated by x with respect to the surface vertex, the aspheric shape can be expressed as follows:

$$x = (h^2/R)/[1 + [1-(1+k)(h/R)^2]^{1/2}] + A4h^4 + A6h^6 + A8h^8 + A10h^{10},$$

where R denotes a paraxial radius of curvature. For example, "E-Z" means "$10^{-Z}$." In the numerical examples, the last two surfaces are surfaces of an optical block such as a filter and a phase plate.

A value of d10 in the first to fourth and sixth exemplary embodiments and a value of d8 in the fifth exemplary embodiment have a negative sign because the aperture stop SP (SPa) and the object-side lens G31 of the third lens unit L3 are arranged from the object side to the image side.

In each exemplary embodiment, the back focus BF is obtained by expressing the distance from the last lens surface to the paraxial image plane using an air-equivalent length. The entire lens length is obtained by adding a distance from the lens surface closest to the object side to the last lens surface and the back focus. In addition, a relationship between each condition described above and each numerical example is shown in Table 1.

NUMERICAL EXAMPLE 1 unit mm

Surface data

| Surface number | r | d | nd | vd |
|---|---|---|---|---|
| 1 | 15.849 | 0.50 | 1.95906 | 17.5 |
| 2 | 11.331 | 2.40 | 1.88300 | 40.8 |
| 3 | 76.277 | Variable | | |
| 4 | 104.702 | 0.40 | 1.88300 | 40.8 |
| 5 | 5.139 | 2.50 | | |
| 6 | −13.411 | 0.40 | 1.77250 | 49.6 |
| 7 | 51.374 | 0.10 | | |
| 8 | 12.872 | 1.10 | 1.95906 | 17.5 |
| 9 | 115.965 | Variable | | |
| 10(Stop) | ∞ | −0.40 | | |
| 11* | 4.548 | 1.55 | 1.76802 | 49.2 |
| 12* | −38.972 | 0.20 | | |
| 13(Stop) | ∞ | 0.00 | | |
| 14 | 5.907 | 0.40 | 1.92286 | 18.9 |
| 15 | 3.299 | 1.00 | | |
| 16 | ∞ | Variable | | (Flare cut stop) |
| 17 | 10.381 | 1.75 | 1.60311 | 60.6 |
| 18 | 76.104 | Variable | | |
| 19 | ∞ | 1.00 | 1.51633 | 64.1 |
| 20 | ∞ | 1.0 | | |
| Image plane | ∞ | | | |

Aspheric data

11th surface $K = -7.30686e-001$  $A4 = -1.41734e-004$  $A6 = -2.78678e-005$
$A8 = -1.53266e-006$ 12th surface $K = -2.51101e+000$  $A4 = 2.11418e-004$  $A6 = -5.24388e-005$

Various data
zoom ratio 7.53

| | | | | | |
|---|---|---|---|---|---|
| Focal length | 5.15 | 13.89 | 38.80 | 7.29 | 30.65 |
| F-number | 3.24 | 4.14 | 7.00 | 3.57 | 6.06 |
| Angle of view | 32.91 | 15.44 | 5.70 | 26.49 | 7.21 |
| Image height | 3.33 | 3.84 | 3.88 | 3.63 | 3.88 |
| Entire lens length | 34.89 | 37.04 | 48.54 | 33.94 | 45.11 |
| BF | 4.54 | 7.03 | 4.08 | 5.75 | 4.16 |
| d3 | 0.35 | 5.48 | 8.53 | 1.59 | 8.23 |
| d9 | 12.34 | 4.42 | 0.70 | 8.45 | 1.73 |
| d16 | 5.75 | 8.21 | 23.34 | 6.24 | 19.10 |
| d18 | 2.88 | 5.37 | 2.42 | 4.09 | 2.51 |

Zoom lens unit data

| Unit | Starting surface | focal length |
|---|---|---|
| 1 | 1 | 23.09 |
| 2 | 4 | −5.94 |
| 3 | 10 | 9.68 |
| 4 | 17 | 19.73 |
| 5 | 19 | ∞ |

NUMERICAL EXAMPLE 2 unit mm

Surface data

| Surface number | r | D | nd | vd |
|---|---|---|---|---|
| 1 | 28.042 | 0.50 | 1.95906 | 17.5 |
| 2 | 18.220 | 2.25 | 1.88300 | 40.8 |
| 3 | −939.842 | Variable | | |
| 4 | −104.934 | 0.40 | 1.88300 | 40.8 |
| 5 | 6.209 | 2.10 | | |
| 6 | −13.225 | 0.40 | 1.88300 | 40.8 |
| 7 | −248.387 | 0.10 | | |
| 8 | 16.949 | 1.20 | 1.95906 | 17.5 |
| 9 | −72.219 | Variable | | |
| 10(Stop) | ∞ | −0.40 | | |
| 11* | 4.606 | 1.58 | 1.76802 | 49.2 |
| 12* | −90.883 | 0.20 | | |
| 13(Stop) | ∞ | 0.00 | | |
| 14 | 5.400 | 0.45 | 1.95906 | 17.5 |
| 15 | 3.241 | 1.00 | | |
| 16 | ∞ | Variable | | (Flare cut stop) |
| 17* | 10.191 | 1.80 | 1.58313 | 59.4 |
| 18 | 45.715 | Variable | | |
| 19 | ∞ | 1.00 | 1.51633 | 64.1 |
| 20 | ∞ | 1.0 | | |
| Image plane | ∞ | | | |

Aspheric data

11th surface $K = -4.67580e-001$  $A0 = -4.10547e-004$  $A6 = -2.45809e-005$
$A8 = -2.88449e-006$ 12th surface $K = 5.51109e+000$  $A4 = 8.06241e-005$  $A6 = -5.24388e-005$ 17th surface $K = -2.73940e+000$  $A4 = 2.05539e-004$  $A6 = 1.83181e-006$
$A8 = -6.77982e-008$

Various data
zoom ratio 7.52

| | | | | | | | |
|---|---|---|---|---|---|---|---|
| Focal length | 5.16 | 9.78 | 38.8 | 7.79 | 20.01 | 31.37 | 14.10 |
| F-number | 3.49 | 4.09 | 7.00 | 3.88 | 5.11 | 6.37 | 4.50 |
| Angle of View | 32.87 | 20.95 | 5.70 | 24.99 | 10.96 | 7.04 | 15.13 |
| Image height | 3.33 | 3.74 | 3.88 | 3.63 | 3.88 | 3.88 | 3.81 |
| Entire lens length | 35.79 | 36.39 | 51.58 | 35.22 | 43.38 | 48.84 | 39.49 |
| BF | 4.43 | 6.46 | 5.20 | 5.80 | 6.49 | 5.23 | 6.95 |
| d3 | 0.35 | 4.92 | 13.52 | 2.93 | 10.63 | 12.66 | 8.14 |
| d9 | 13.67 | 6.83 | 0.20 | 8.69 | 3.03 | 1.21 | 4.61 |
| d16 | 5.75 | 6.59 | 21.08 | 6.21 | 11.66 | 18.16 | 8.21 |
| d18 | 2.77 | 4.80 | 3.54 | 4.15 | 4.83 | 3.57 | 5.29 |

Zoom lens unit data

| Unit | Starting surface | Focal length |
|---|---|---|
| 1 | 1 | 32.3 |
| 2 | 4 | −7.38 |
| 3 | 10 | 10.10 |
| 4 | 17 | 22.08 |
| 5 | 19 | ∞ |

NUMERICAL EXAMPLE 3 unit mm

Surface data

| Surface number | r | D | nd | νd |
|---|---|---|---|---|
| 1 | 16.619 | 0.50 | 2.00170 | 20.6 |
| 2 | 11.022 | 2.40 | 1.88300 | 40.8 |
| 3 | 112.230 | Variable | | |
| 4 | 115.971 | 0.40 | 1.88300 | 40.8 |
| 5 | 5.180 | 2.50 | | |
| 6 | −13.000 | 0.40 | 1.77250 | 49.6 |
| 7 | 102.672 | 0.10 | | |
| 8 | 13.306 | 1.10 | 1.95906 | 17.5 |
| 9 | 91.334 | Variable | | |
| 10(Stop) | ∞ | −0.40 | | |
| 11* | 3.927 | 1.55 | 1.55332 | 71.7 |
| 12* | −24.688 | 0.20 | | |
| 13(Stop) | ∞ | 0.00 | | |
| 14 | 4.106 | 0.40 | 2.00170 | 20.6 |
| 15 | 2.927 | 1.00 | | |
| 16 | ∞ | Variable | | (Flare cut stop) |
| 17 | 11.917 | 1.75 | 1.60311 | 60.6 |
| 18 | 34.456 | Variable | | |
| 19 | ∞ | 1.00 | 1.51633 | 64.1 |
| 20 | ∞ | 1.0 | | |
| Image plane | ∞ | | | |

Aspheric data

11th surface

K = −8.22170e−001  A4 = 3.44309e−004  A6 = −2.34187e−005
A8 = −1.39388e−006

12th surface

K = 4.08303e+000  A4 = 5.15933e−004  A6 = −5.24388e−005

Various data
zoom ratio 7.56

| Focal length | 5.14 | 14.51 | 38.8 | 7.49 | 31.73 | 36.51 | 16.56 |
|---|---|---|---|---|---|---|---|
| F-number | 3.19 | 4.24 | 7.00 | 3.57 | 6.34 | 6.86 | 4.42 |
| Angle of view | 32.98 | 14.46 | 5.70 | 25.86 | 6.96 | 6.06 | 12.97 |
| Image height | 3.33 | 3.74 | 3.88 | 3.63 | 3.88 | 3.88 | 3.81 |
| Entire lens length | 36.02 | 37.92 | 48.66 | 34.96 | 45.54 | 47.64 | 38.95 |
| BF | 4.54 | 7.22 | 4.08 | 5.85 | 2.72 | 3.29 | 7.01 |
| d3 | 0.35 | 5.54 | 8.28 | 1.73 | 7.96 | 8.12 | 6.24 |
| d9 | 13.47 | 4.96 | 0.91 | 9.23 | 2.06 | 1.31 | 4.37 |
| d16 | 5.75 | 8.30 | 23.48 | 6.26 | 20.9 | 23.01 | 9.42 |
| d18 | 2.88 | 5.56 | 2.42 | 4.19 | 1.06 | 1.63 | 5.35 |

Zoom lens unit data

| Unit | Starting surface | Focal length |
|---|---|---|
| 1 | 1 | 23.58 |
| 2 | 4 | −6.01 |
| 3 | 10 | 9.65 |
| 4 | 17 | 29.35 |
| 5 | 19 | ∞ |

NUMERICAL EXAMPLE 4 unit mm

Surface data

| Surface number | r | d | nd | νd |
|---|---|---|---|---|
| 1 | 17.026 | 0.60 | 1.95906 | 17.5 |
| 2 | 12.614 | 3.60 | 1.83481 | 42.7 |
| 3 | 70.767 | Variable | | |
| 4 | 56.641 | 0.50 | 1.85135 | 40.1 |
| 5* | 4.804 | 3.10 | | |
| 6 | −17.563 | 0.40 | 1.88300 | 40.8 |
| 7 | 28.246 | 0.10 | | |
| 8 | 12.527 | 1.35 | 1.95906 | 17.5 |
| 9 | 171.495 | Variable | | |
| 10(Stop) | ∞ | −0.40 | | |
| 11* | 5.473 | 1.75 | 1.67790 | 54.9 |
| 12* | −20.905 | 0.10 | | |
| 13(Stop) | ∞ | 0.00 | | |
| 14 | 4.154 | 0.70 | 1.48749 | 70.2 |
| 15 | 7.047 | 0.40 | 1.84666 | 23.9 |
| 16 | ∞ | Variable | | (Flare cut stop) |
| 17 | ∞ | Variable | | |
| 18 | 9.707 | 1.70 | 1.48749 | 70.2 |
| 19 | 447.932 | Variable | | |
| 20 | ∞ | 1.00 | 1.51633 | 64.1 |
| 21 | ∞ | 1.0 | | |
| Image plane | ∞ | | | |

Aspheric data

5th surface

K = −4.35183e−002  A4 = −4.40142e−005  A6 = 5.03252e−006
A8 = −3.49994e−007

11th surface

K = 9.09382e−002  A4 = −9.92836e−004  A6 = −1.65820e−005
A8 = −4.67887e−006

12th surface

K = 3.86664e+001  A4 = 5.00792e−004

Various data
zoom ratio 9.55

| Focal length | 4.43 | 16.24 | 42.28 | 6.90 | 26.24 | 32.35 | 14.11 |
|---|---|---|---|---|---|---|---|
| F-number | 2.87 | 4.27 | 7.46 | 3.34 | 5.32 | 6.16 | 4.09 |
| Angle of view | 36.98 | 12.98 | 5.24 | 28.32 | 8.40 | 6.83 | 15.12 |
| Image height | 3.33 | 3.74 | 3.88 | 3.72 | 3.88 | 3.88 | 3.81 |
| Entire lens length | 37.19 | 41.57 | 55.25 | 36.35 | 47.53 | 50.63 | 40.24 |
| BF | 3.77 | 7.12 | 3.99 | 4.76 | 6.07 | 4.89 | 6.95 |
| d3 | 0.30 | 7.24 | 10.13 | 1.99 | 9.39 | 9.79 | 6.39 |
| d9 | 13.48 | 3.44 | 0.80 | 8.69 | 1.96 | 1.50 | 4.05 |
| d17 | 4.74 | 8.86 | 25.44 | 6.01 | 15.21 | 19.55 | 7.95 |
| d19 | 2.11 | 5.46 | 2.33 | 3.10 | 4.41 | 3.23 | 5.29 |

Zoom lens unit data

| Unit | Starting surface | Focal length |
|---|---|---|
| 1 | 1 | 27.67 |
| 2 | 4 | −5.75 |
| 3 | 10 | 9.11 |
| 4 | 18 | 20.33 |
| 5 | 20 | ∞ |

NUMERICAL EXAMPLE 5 unit mm

Surface data

| Surface number | r | d | nd | νd |
|---|---|---|---|---|
| 1 | 17.175 | 0.60 | 1.92286 | 18.9 |
| 2 | 12.839 | 2.45 | 1.77250 | 49.6 |
| 3 | 79.705 | Variable | | |
| 4 | −219.342 | 0.50 | 1.98852 | 52.5 |
| 5* | 5.053 | 1.68 | | |
| 6* | 8.465 | 1.38 | 2.00178 | 19.3 |
| 7* | 13.487 | Variable | | |
| 8(Stop) | ∞ | −0.40 | | |
| 9* | 4.873 | 1.58 | 1.76802 | 49.2 |
| 10* | −67.554 | 0.20 | | |
| 11(Stop) | ∞ | 0.00 | | |
| 12 | 5.568 | 0.45 | 1.92286 | 18.9 |
| 13 | 3.390 | 1.00 | | |
| 14 | ∞ | Variable | | (Flare cut stop) |
| 15* | 9.485 | 1.72 | 1.58313 | 59.4 |
| 16 | 36.724 | Variable | | |
| 17 | ∞ | 1.00 | 1.51633 | 64.1 |
| 18 | ∞ | 1.0 | | |
| Image plane | ∞ | | | |

Aspheric data

5th surface

K = −3.38770e−001  A4 = −4.42797e−005  A6 = 3.05911e−006
A8 = −1.56916e−008

6th surface

K = 9.08978e−001  A4 = −5.83938e−004

7th surface

K = 2.19435e+000  A4 = −6.35313e−004  A6 = 1.14956e−006
A8 = −4.42220e−008

9th surface

K = −3.84049e−001  A4 = −4.10059e−004  A6 = −3.79913e−005
A8 = −1.87872e−006

10th surface

K = −2.14859e+002  A4 = 3.23872e−005  A6 = −5.24388e−005

15th surface

K = −9.82655e−001  A4 = 6.41585e−005  A6 = 2.49422e−006
A8 = −1.99592e−008

Various data
zoom ratio 8.41

| | | | | | | | |
|---|---|---|---|---|---|---|---|
| Focal length | 5.12 | 11.06 | 43.10 | 8.51 | 33.06 | 36.51 | 14.55 |
| F-number | 3.00 | 3.61 | 6.21 | 3.41 | 5.33 | 5.66 | 3.84 |
| Angle of view | 33.04 | 18.71 | 5.14 | 23.12 | 6.68 | 6.06 | 14.68 |
| Image height | 3.33 | 3.74 | 3.88 | 3.63 | 3.88 | 3.88 | 3.81 |
| Entire lens length | 36.67 | 37.49 | 51.58 | 36.26 | 48.11 | 49.30 | 39.45 |
| BF | 4.53 | 6.84 | 4.47 | 6.04 | 5.01 | 4.59 | 7.33 |
| d3 | 0.40 | 5.51 | 12.70 | 3.41 | 12.16 | 12.37 | 7.74 |
| d7 | 14.83 | 7.11 | 1.01 | 9.12 | 2.17 | 1.79 | 5.46 |
| d14 | 5.75 | 6.87 | 22.24 | 6.52 | 17.61 | 19.39 | 7.76 |
| d16 | 2.87 | 5.18 | 2.81 | 4.39 | 3.35 | 2.93 | 5.67 |

Zoom lens unit data

| Unit | Starting surface | Focal length |
|---|---|---|
| 1 | 1 | 30.07 |
| 2 | 4 | −6.97 |
| 3 | 8 | 10.12 |
| 4 | 15 | 21.43 |
| 5 | 17 | ∞ |

NUMERICAL EXAMPLE 6 unit mm

Surface data

| Surface number | r | d | nd | νd |
|---|---|---|---|---|
| 1 | 18.060 | 0.50 | 1.95906 | 17.5 |
| 2 | 12.975 | 2.35 | 1.88300 | 40.8 |
| 3 | 120.887 | Variable | | |
| 4 | 306.722 | 0.40 | 1.88300 | 40.8 |
| 5 | 5.309 | 2.40 | | |
| 6 | −12.543 | 0.40 | 1.88300 | 40.8 |
| 7 | 5104.418 | 0.10 | | |
| 8 | 14.646 | 1.20 | 1.95906 | 17.5 |
| 9 | 7265.468 | Variable | | |
| 10(Stop) | ∞ | −0.40 | | |
| 11* | 5.014 | 1.58 | 1.76802 | 49.2 |
| 12* | −37.378 | 0.20 | | |
| 13(Stop) | ∞ | 0.00 | | |
| 14 | 5.466 | 0.45 | 1.95906 | 17.5 |
| 15 | 3.426 | 1.00 | | |
| 16 | ∞ | 0.00 | | |
| 17 | ∞ | Variable | | (Flare cut stop) |
| 18 | −36.020 | 0.50 | 1.53172 | 48.8 |
| 19 | 128.808 | Variable | | |
| 20* | 9.048 | 2.50 | 1.58313 | 59.4 |
| 21 | −324.687 | Variable | | |
| 22 | ∞ | 1.00 | 1.51633 | 64.1 |
| 23 | ∞ | 1.0 | | |
| Image plane | ∞ | | | |

Aspheric data

11th surface

K = −3.88939e−001  A4 = −5.30085e−004  A6 = −2.31130e−005
A8 = −4.34309e−006

12th surface

K = 1.00426e+002  A4 = 3.92419e−004  A6 = −5.24388e−005

20th surface

K = −7.07680e−001  A4 = −7.40386e−006  A6 = 1.37239e−006
A8 = −1.81904e−008

Various data
zoom ratio 7.54

| | | | | | | | |
|---|---|---|---|---|---|---|---|
| Focal length | 5.14 | 10.78 | 38.80 | 8.43 | 22.12 | 32.73 | 15.78 |
| F-number | 3.50 | 4.13 | 7.00 | 3.94 | 5.11 | 6.42 | 4.51 |
| Angle of view | 32.94 | 19.15 | 5.70 | 23.30 | 9.94 | 6.75 | 13.59 |
| Image height | 3.33 | 3.74 | 3.88 | 3.63 | 3.88 | 3.88 | 3.81 |
| Entire lens length | 36.97 | 37.37 | 50.88 | 36.29 | 43.8 | 48.58 | 40.25 |
| BF | 3.17 | 5.92 | 5.20 | 5.04 | 6.04 | 5.03 | 6.54 |
| d3 | 0.35 | 4.22 | 9.65 | 2.59 | 8.42 | 9.32 | 6.74 |
| d9 | 13.27 | 5.99 | 0.67 | 7.77 | 2.82 | 1.49 | 4.03 |
| d17 | 5.15 | 6.29 | 13.69 | 6.00 | 8.09 | 11.17 | 6.92 |
| d19 | 1.84 | 1.78 | 8.48 | 1.72 | 5.25 | 8.39 | 2.84 |
| d21 | 1.51 | 4.26 | 3.54 | 3.38 | 4.38 | 3.37 | 4.88 |

-continued unit mm

Zoom lens unit data

| Unit | Starting surface | Focal length |
|---|---|---|
| 1 | 1 | 24.66 |
| 2 | 4 | −6.05 |
| 3 | 10 | 9.56 |
| 4 | 18 | −52.88 |
| 5 | 20 | 15.14 |
| 6 | 22 | ∞ |

TABLE 1

| Conditions | Examples | | | | | |
|---|---|---|---|---|---|---|
| | 1 | 2 | 3 | 4 | 5 | 6 |
| (1) $0.5 < M2/fw < 5.0$ | 1.063 | 0.507 | 0.917 | 1.859 | 0.507 | 0.896 |
| (2) $0.1 < M1/M3 < 1.0$ | 0.797 | 0.981 | 0.732 | 0.863 | 0.908 | 0.808 |
| (3) $1.85 < Nd1n < 2.50$ | 1.959 | 1.959 | 2.002 | 1.959 | 1.923 | 1.959 |
| (4) $5 < vd1n < 21$ | 17.47 | 17.47 | 20.60 | 17.47 | 18.90 | 17.47 |
| (5) $1.50 < Nd3p < 2.50$ | 1.768 | 1.768 | 1.553 | 1.678 | 1.768 | 1.768 |
| (6) $40 < vd3p < 72$ | 49.24 | 49.24 | 71.68 | 54.89 | 49.24 | 49.24 |
| (7X) $30 < vd1p < 55$ | 40.76 | 40.76 | 40.76 | 42.71 | 49.60 | 40.76 |
| (7) $15 < vd1p - vd1n < 40$ | 23.29 | 23.29 | 20.16 | 25.24 | 30.70 | 23.29 |
| (8) $0.7 < \beta 4t/\beta 4w < 1.3$ | 1.033 | 0.953 | 1.020 | 0.986 | 0.893 | 1.193 |
| (9) $2.0 < \beta 3t/\beta 3w < 8.0$ | 3.217 | 3.428 | 3.533 | 4.461 | 3.237 | 3.376 |
| (10) $2.0 < D3p/D3n < 6.0$ | 3.875 | 3.511 | 3.875 | 2.500 | 3.511 | 3.511 |
| (11) $0.2 < f1p/f1 < 1.0$ | 0.642 | 0.627 | 0.581 | 0.646 | 0.648 | 0.661 |

Next, a digital camera in which the zoom lens according to an exemplary embodiment of the invention is used as a photographic optical system will be described with reference to FIG. 13.

In FIG. 13, reference numeral 20 denotes a camera body, and reference numeral 21 denotes a photographic optical system including any one of the zoom lenses described in the first to sixth exemplary embodiments. Reference numeral 22 denotes a solid-state image sensor (a photoelectric conversion element) such as a CCD sensor or a CMOS sensor for receiving an object image formed by the photographic optical system 21. Reference numeral 23 denotes a memory configured to records information corresponding to an object image photoelectrically converted by the solid-state image sensor 22. Reference numeral 24 denotes a viewfinder that includes a liquid crystal display panel and the like for observing an object image formed on the solid-state image sensor 22.

In this manner, it is possible to implement a miniaturized image pickup apparatus having high optical performance by applying the zoom lens according an exemplary embodiment of the invention to an optical apparatus such as a digital camera.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-173809 filed Aug. 9, 2011, which is hereby incorporated by reference herein in its entirety.

What is claimed is:

1. A zoom lens comprising, in order from an object side to an image side, a first lens unit of a positive refractive power, a second lens unit of a negative refractive power, a third lens unit of a positive refractive power, and a rear lens group including one or more lens units, the first, second, and third lens units being moved towards the object side during zooming from a wide-angle end to a telephoto end, wherein the first lens unit includes a positive lens and a negative lens, and following conditions are satisfied:

$0.05 < M2/fw < 5.0$, and $0.1 < M1/M3 < 1.0$, where M1, M2, and M3 denote movement amounts of the first, second, and third lens units, respectively, during zooming from the wide-angle end to the telephoto end, the movement amount denotes differences between positions of the lens unit at the wide-angle end and the telephoto end, a sign of the movement amount is set to be positive in a case where the lens unit is arranged nearer to an object side in the telephoto end than in the wide-angle end, and fw denotes a focal length of the entire zoom lens at the wide-angle end.

2. The zoom lens according to claim 1, wherein the following conditions are satisfied:

$1.85 < Nd1n < 2.50$, and $5.0 < vd1n < 21.0$, where Nd1$n$ and vd1$n$ denote a refractive index and an Abbe number, respectively, of a material of the negative lens included in the first lens unit.

3. The zoom lens according to claim 1, wherein the following conditions are satisfied:

$1.50 < Nd3p < 2.50$, and $40.0 < vd3p < 72.0$, where Nd3$p$ and vd3$p$ denote a refractive index and an Abbe number, respectively, of a material of a positive lens included in the third lens unit.

4. The zoom lens according to claim 1, wherein the following condition is satisfied:

$15.0 < vd1p - vd1n < 40.0$, where vd1$n$ and vd1$p$ denote Abbe numbers of materials of the negative lens and the positive lens, respectively, included in the first lens unit.

5. The zoom lens according to claim 1, wherein a lens unit closest to the image side of the zoom lens is a focus lens unit, and the following condition is satisfied:

$0.7 < \beta ft/\beta fw < 1.3$, where βfw and βft denote lateral magnifications of the focus lens unit at the wide-angle end and the telephoto end, respectively.

6. The zoom lens according to claim 1, wherein the following condition is satisfied:

$$2.0 < \beta 3t/\beta 3w < 10.0,$$

where β3w and β3t denote lateral magnifications of the third lens unit at the wide-angle end and the telephoto end, respectively.

7. The zoom lens according to claim 1, wherein the following condition is satisfied:

$$2.0 < D3p/D3n < 8.0,$$

where D3p denotes a maximum thickness of a positive lens included in the third lens unit, and D3n denotes a minimum thickness of a negative lens included in the third lens unit.

8. The zoom lens according to claim 1, wherein the following condition is satisfied:

$$0.2 < f1p/f1 < 1.0,$$

where f1p denotes a focal length of the positive lens included in the first lens unit, and f1 denotes a focal length of the first lens unit.

9. The zoom lens according to claim 1, wherein the second lens unit includes a negative lens, a negative lens, and a positive lens in order from the object side to the image side.

10. The zoom lens according to claim 1, wherein the third lens unit includes a positive lens and a negative lens in order from the object side to the image side.

11. The zoom lens according to claim 1, wherein the rear lens group includes a fourth lens unit of a positive refractive power, and the fourth lens unit is moved during zooming.

12. The zoom lens according to claim 1, wherein the rear lens group includes a fourth lens unit of a negative refractive power and a fifth lens unit of a positive refractive power in order from the object side to the image side, and the fourth and fifth lens units are moved during zooming.

13. The zoom lens according to claim 1, wherein the zoom lens is configured to form an image on a solid-state image sensor.

14. An image pickup apparatus comprising:
a zoom lens; and
a solid state image sensor configured to receives an image formed by the zoom lens
wherein the zoom lens comprises, in order from an object side to an image side, a first lens unit of a positive refractive power, a second lens unit of a negative refractive power, a third lens unit of a positive refractive power, and a rear lens group including one or more lens units, the first, second, and third lens units being moved towards the object side during zooming from a wide-angle end to a telephoto end,
wherein the first lens unit includes a positive lens and a negative lens, and following conditions are satisfied:

$$0.5 < M2/fw < 5.0, \text{ and}$$

$$0.1 < M1/M3 < 1.0,$$

where M1, M2, and M3 denote movement amounts of the first, second, and third lens units, respectively, during zooming from the wide-angle end to the telephoto end, the movement amount denotes differences between positions of the lens unit at the wide-angle end and the telephoto end, a sign of the movement amount is set to be positive in a case where the lens unit is arranged at a position nearer to an object side in the telephoto end than in the wide-angle end, and fw denotes a focal length of the entire zoom lens at the wide-angle end.

* * * * *